US012131137B2

United States Patent
Geva et al.

(10) Patent No.: US 12,131,137 B2
(45) Date of Patent: Oct. 29, 2024

(54) SYSTEM AND METHOD FOR THE GENERATION OF AN ADAPTIVE USER INTERFACE IN A WEBSITE BUILDING SYSTEM

(71) Applicant: Wix.com Ltd., Tel Aviv (IL)

(72) Inventors: Ayelet Geva, Tel Aviv (IL); Omer Gartzman, Tel Aviv (IL); Giora Kaplan, Tel Aviv (IL); Shahar Zur, Tel Aviv (IL); Batel Sebbag, Meitar (IL); Amit Kaufman, Tel Aviv (IL); Avi Marcus, Haifa (IL)

(73) Assignee: Wix.com Ltd., Tel Aviv (IL)

( * ) Notice: Subject to any disclaimer, the term of this patent is extended or adjusted under 35 U.S.C. 154(b) by 0 days.

(21) Appl. No.: 16/597,881

(22) Filed: Oct. 10, 2019

(65) Prior Publication Data

US 2020/0117431 A1    Apr. 16, 2020

Related U.S. Application Data

(63) Continuation of application No. 15/175,272, filed on Jun. 7, 2016, now Pat. No. 10,459,699.

(60) Provisional application No. 62/172,102, filed on Jun. 7, 2015.

(51) Int. Cl.
   *G06F 8/38*  (2018.01)
   *G06F 8/34*  (2018.01)

(52) U.S. Cl.
   CPC .  *G06F 8/38* (2013.01); *G06F 8/34* (2013.01)

(58) Field of Classification Search
   CPC .................................. G06F 8/34; G06F 8/38
   See application file for complete search history.

(56) References Cited

U.S. PATENT DOCUMENTS

| | | |
|---|---|---|
| 5,870,559 A | 2/1999 | Leshem et al. |
| 6,313,835 B1 | 11/2001 | Gever et al. |
| 6,996,801 B2 | 2/2006 | Yoneyama |
| 7,111,048 B2 | 9/2006 | Hewett et al. |

(Continued)

FOREIGN PATENT DOCUMENTS

CN    101910990    8/2014

OTHER PUBLICATIONS

Casalánguida et al., "User Interface Design for Responsive Web Applications", 2015, SCITEPRESS (Science and Technology Publications, Lda.) (Year: 2015).*

(Continued)

*Primary Examiner* — Wei Y Zhen
*Assistant Examiner* — Junchun Wu
(74) *Attorney, Agent, or Firm* — Heidi Brun Associates Ltd.

(57) ABSTRACT

A system for a website building system implemented on a server, the server having at least one processor and a memory and including a site analyzer to generate a representative component for each of a cluster of multiple components of a website of a user, based on an analysis of the attributes of the multiple components; and an editor UI builder to create a dynamically modified user interface at least from the representative components for a visual editor of said website; where the site analyzer and the editor UI builder change the dynamically modified user interface as the user edits the website; and where the visual editor includes a regular user interface and said dynamically modified user interface.

24 Claims, 20 Drawing Sheets

(56) References Cited

U.S. PATENT DOCUMENTS

| | | | |
|---|---|---|---|
| 7,409,642 B2 | 8/2008 | Bent et al. | |
| 7,647,564 B2* | 1/2010 | Olander | G06F 9/451 |
| | | | 715/854 |
| 8,229,977 B1* | 7/2012 | Anderson | G06F 8/38 |
| | | | 717/124 |
| 8,869,049 B1* | 10/2014 | Li | G06F 8/36 |
| | | | 715/705 |
| 9,026,898 B2 | 5/2015 | Bobykin et al. | |
| 9,430,194 B1* | 8/2016 | Childs | G06F 8/33 |
| 10,185,703 B2 | 1/2019 | Abrahami | |
| 2002/0099556 A1* | 7/2002 | Xia | G06Q 30/02 |
| | | | 715/206 |
| 2004/0230679 A1 | 11/2004 | Bales et al. | |
| 2005/0097008 A1 | 5/2005 | Ehring et al. | |
| 2005/0210382 A1 | 9/2005 | Cascini | |
| 2005/0267787 A1* | 12/2005 | Rose | G06F 16/951 |
| | | | 705/5 |
| 2006/0064674 A1 | 3/2006 | Olson et al. | |
| 2007/0050373 A1 | 3/2007 | Ahmed et al. | |
| 2007/0050753 A1* | 3/2007 | Holt | G06F 8/38 |
| | | | 717/114 |
| 2008/0235661 A1 | 9/2008 | Arpana et al. | |
| 2009/0068991 A1* | 3/2009 | Aaltonen | H04L 67/53 |
| | | | 455/466 |
| 2009/0089746 A1 | 4/2009 | Rigolet | |
| 2010/0037156 A1 | 2/2010 | Hosoda | |
| 2011/0023017 A1* | 1/2011 | Calvin | G06F 3/04842 |
| | | | 717/120 |
| 2011/0214117 A1 | 9/2011 | Hattori et al. | |
| 2011/0264641 A1 | 10/2011 | Yang et al. | |
| 2011/0321003 A1* | 12/2011 | Doig | G06Q 30/0276 |
| | | | 717/107 |
| 2012/0005025 A1* | 1/2012 | Aaltonen | G06Q 30/02 |
| | | | 705/400 |
| 2012/0005604 A1* | 1/2012 | Wirch | G06F 8/34 |
| | | | 715/765 |
| 2012/0011447 A1* | 1/2012 | Bennett | G06F 16/958 |
| | | | 715/745 |
| 2012/0084689 A1 | 4/2012 | Ledet et al. | |
| 2012/0266131 A1 | 10/2012 | Nojiri et al. | |
| 2013/0205211 A1* | 8/2013 | Warren | G06Q 10/10 |
| | | | 707/769 |
| 2013/0305218 A1* | 11/2013 | Hirsch | G06F 8/30 |
| | | | 717/106 |
| 2014/0013234 A1* | 1/2014 | Beveridge | G06F 9/452 |
| | | | 715/740 |
| 2014/0026113 A1* | 1/2014 | Farooqi | G06F 8/36 |
| | | | 717/107 |
| 2014/0059663 A1* | 2/2014 | Rajshekar | G06F 16/40 |
| | | | 726/6 |
| 2014/0075283 A1 | 3/2014 | Coursol | |
| 2014/0101528 A1 | 4/2014 | Pelleg et al. | |
| 2014/0181703 A1 | 6/2014 | Sullivan et al. | |
| 2014/0181788 A1* | 6/2014 | Sullivan | G06F 8/38 |
| | | | 717/109 |
| 2014/0222702 A1* | 8/2014 | Jennings | G06Q 30/0631 |
| | | | 705/319 |
| 2014/0282218 A1 | 9/2014 | Kaufman et al. | |
| 2014/0351063 A1* | 11/2014 | Brewer | G06Q 30/0276 |
| | | | 705/14.72 |
| 2015/0074516 A1 | 3/2015 | Ben-Aharon et al. | |
| 2015/0089353 A1* | 3/2015 | Folkening | H04L 67/10 |
| | | | 715/234 |
| 2015/0154164 A1 | 6/2015 | Goldstein et al. | |
| 2015/0277723 A1* | 10/2015 | Banerjee | G06F 8/36 |
| | | | 715/763 |
| 2015/0310124 A1 | 10/2015 | Ben-Aharon et al. | |
| 2016/0019576 A1* | 1/2016 | Boddu | G06Q 30/0241 |
| | | | 705/14.4 |
| 2016/0124839 A1* | 5/2016 | Mordo | G06F 11/3664 |
| | | | 717/124 |
| 2016/0124923 A1 | 5/2016 | Lim et al. | |
| 2016/0350794 A1* | 12/2016 | Amrany | G06Q 30/0222 |
| 2017/0103050 A9 | 4/2017 | Underwood | |
| 2017/0235465 A1* | 8/2017 | Marin | G06F 9/451 |
| | | | 715/716 |
| 2017/0235550 A1 | 8/2017 | Fu et al. | |
| 2018/0004544 A1* | 1/2018 | Vasiltschenko | G06F 9/454 |

OTHER PUBLICATIONS

Nielsen et al., "SunWeb: user interface design for Sun Microsystem's internal Web", 1995, Elsevier Science B.V. (Year: 1995).*

Calvary et al., "A Unifying Reference Framework for multi-target user interfaces", 2003, Elsevier Science B.V. (Year: 2003).*

Leff et al., "Web-Application Development Using the Model/View/Controller Design Pattern", 2001, IEEE (Year: 2001).*

Taylor et al., "A Component- and Message-Based Architectural Style for GUI Software", 1995, ACM (Year: 1995).*

Safavi, "Interface Design Issues to Enhance Usability of E-Commerce Websites and Systems", 2009, IEEE (Year: 2009).*

International Search Report for corresponding PCT application PCT/IB2016/053334 mailed on Sep. 7, 2016.

Supplementary European Search Report for corresponding European application 16 80 6978.9 dated Jan. 28, 2019.

Crescenzi et al., "Automatic Information Extraction from Large Websites", Sep. 2004, ACM, vol. 51, No. 5, pp. 731-779 (Year: 2004).

Huang, "Designing website attributes to induce experiential encounters", 2003, Elsevier Science Ltd. (Year: 2003).

Islami et al., "Component Design of Business Process Web Content Management System for Online Shop Website", 2014, IEEE (Year: 2014).

Pan et al., "Design and Implementation of E-commerce Feature Major Website", 2010, IEEE (Year: 2010).

Plessers et al., "Annotation for the Semantic Web During Website Development", 2004, Springer-Verlag, ICWE 2004, LNCS 3140, pp. 349-353 (Year: 2004).

* cited by examiner

SYSTEM AND METHOD FOR THE GENERATION OF AN ADAPTIVE USER INTERFACE IN A WEBSITE BUILDING SYSTEM

CROSS REFERENCE TO RELATED APPLICATIONS

This application is a continuation application of U.S. patent application Ser. No. 15/175,272 filed Jun. 7, 2016 which claims priority from U.S. provisional patent application 62/172,102 filed Jun. 7, 2015 both of which are incorporated herein by reference.

FIELD OF THE INVENTION

The present invention relates to website building systems generally and to editing tools in particular.

BACKGROUND OF THE INVENTION

Website building systems are commonly used to create interactive websites. A website building system may be a standalone system, or may be embedded inside a larger editing system. It may also be on-line (i.e. application are edited and stored on a server), off-line or partially on-line (with websites being edited locally but uploaded to a central server). On-line website building system providers typically include a site hosting package as part of their offering, with site users accessing a hosting server managed by the website building system provider.

The sites are typically created and edited by users (also known as designers), and are then accessed by end-users.

A website building system typically allows the user to create and edit applications. A visually designed application consists of pages, containers and components. Pages are typically displayed separately and contain components.

Components are typically arranged in a hierarchy of containers (single page and multi-page) inside the page including atomic components. A multi-page container may display multiple mini-pages.

Components typically have attributes (e.g. size, position, color, frame type, etc.) and possibly content (e.g. contained text in a text component) as further detailed below.

Pages may use templates either general page templates or component templates. Specific cases for templates include the use of an application master page containing components replicated in all other regular pages, and the use of application header/footer (which repeat on all pages).

The website building system may also provide full site templates, which provide a template for an entire site (typically including multiple pages).Users may base their website on such full site templates, or start editing a blank site (creating the entire site structure by themselves).

The arrangement of components inside a page is known as a layout.

Pages may also include various plug-in components which may be provided or hosted by the website building system vendor itself (such as described in US Patent Publication No. 2014-0282218, entitled "DEVICE, SYSTEM, AND METHOD OF WEBSITE BUILDING BY UTILIZING DATA LISTS" published on 18 Sep. 2014 and assigned to the common assignee of the present invention) or by third party providers (i.e. third party applications).

Some of these plug-in components may be simple (e.g. a Facebook like button) and some may be complex (e.g. a complete e-Shop plug-in).

Components may be fixed (such as a given geometrical shape) or based on a content management system (CMS) (such as a component containing a picture selected from a database of available pictures). Such a database may be extended by the user though importing (in this example) additional pictures.

Components may also be based on user-specified content, (such as a text area into which the user enters text) or be based on external information (static or dynamic), such as a RSS feed displaying information from an external data source or the content of a given internet page.

Component appearance can be modified by resizing, rotation and similar operations. Their appearance and behavior can also be modified by various modifiers, such as blurring and animation.

Editing of the created graphical application is typically performed through a graphical user interface (GUI) which typically includes one or more menu hierarchies, a current page working area (also known as stage) and various additional elements such as a page manager as illustrated in FIG. 1 to which reference is now made.

The menu hierarchies typically include a "add component" sub-menu which presents a list of available components, divided into categories. The user may add an object to the stage from this menu (e.g. using an "add object" button or drag and drop from the available components palette to the stage).

The menu hierarchies may include a fixed (e.g. screen side/top/bottom) start menu and may also include floating UI elements (e.g. panels, toolbars or menus) which pop up on certain actions (e.g. clicking or right-clicking on a given component) and present options relevant for the selected component.

The menu hierarchies may also include setting panels which allow the designer to customize the attributes of a given component.

A specific set of attributes for a given components (e.g. a button having a given shape, color, text font) is referred to as component configuration. It will be appreciated that the component configuration definition does not include its content (e.g. the button's text label), position and size.

A component may have multiple states, each of may be characterized by a different state-specific configuration. For example a button may have pressed and un-pressed states.

Some or all components may have a different state used when the mouse hovers over them.

A component may represent an external data sources (e.g. a newsfeed, an e-mail mailbox etc.). Such a component may use a different configuration when messages are waiting.

The system may require that some or all attributes will remain identical between the states.

SUMMARY OF THE PRESENT INVENTION

There is provided, in accordance with a preferred embodiment of the present invention, a system for a website building system implemented on a server, the server having at least one processor and a memory. The system includes a site analyzer to generate a representative component for each of a cluster of multiple components of a website of a user, based on an analysis of the attributes of the multiple components; an editor UI builder to create a dynamically modified user interface at least from the representative components for a visual editor of the website building system; where the site analyzer and the editor UI builder change the dynamically modified user interface as the user edits the website; and where the visual editor includes a regular user interface and the dynamically modified user interface.

Moreover, in accordance with a preferred embodiment of the present invention, the regular user interface includes at least one regular menu hierarchy.

Further, in accordance with a preferred embodiment of the present invention, the system also includes a dynamic UI runner to generate and display the dynamically modified user interface.

Still further, in accordance with a preferred embodiment of the present invention, the system also includes a regular UI modifier to modify the regular user interface of the visual editor based on the use of the website components and associated third party applications; a marketer to retrieve at least one of a promotional package and a marketing campaign for the dynamic UI runner to present on the dynamically modified user interface; and a component definition tool to receive edits to the web site components from at least one of: a vendor of the website building system and the user.

Additionally, in accordance with a preferred embodiment of the present invention, the system includes at least one database to store at least one of user information, website information, website editing history, business intelligence, templates, applications associated with the website and pre-defined information.

Moreover, in accordance with a preferred embodiment of the present invention, the dynamically generated user interface includes at least one dynamic variants area panel and where each at least one dynamic variants area panel includes at least one dynamic variants area section.

Further, in accordance with a preferred embodiment of the present invention, the site analyzer includes a page analyzer to filter and classify the website components on at least one of: a page and a partial page of the website; a component clusterer to create the cluster based on multi-dimensional attribute spaces and attributes of the website components; and a representative component generator to determine the representative component from the cluster based on at least one of: geometric attribute parameters, average attribute dimensions and importance based criteria and to create the representative component based on at least one of: geometrical location, a mathematical function of dimensions and importance based criteria if the cluster has no representative component.

Still further, in accordance with a preferred embodiment of the present invention, the editor UI builder includes a searcher to search for query result components produced as a result of a user search request; a dynamic variants area section builder to build the at least one dynamic variants area section based on representative components, the query result components, pre-defined information and templates; and a menu generator to generate final menu hierarchies based on the at least one dynamic variants area section.

Additionally, in accordance with a preferred embodiment of the present invention, the dynamic UI runner includes a receiver to the menu hierarchies from the menu generator; a style applier to receive and to apply styles from the user to components of the menu hierarchies; a component placer to place the components of the menu hierarchies into the at least one dynamic area variants area section in a visual layout for menu selection; and an editing UI runner to run the menu hierarchies and create a display for the dynamically modified user interface based on the style applier and the component placer.

Moreover, in accordance with a preferred embodiment of the present invention, the style applier applies the styles to components within the same cluster of the representative component according to pre-defined cluster definitions.

Further, in accordance with a preferred embodiment of the present invention, the at least one dynamic variants area section includes an interface to a third party application.

Still further, in accordance with a preferred embodiment of the present invention, the editing UI runner performs modification to the components of the menu hierarchies and where the modifications are at least one of: component thumbnail creation, component miniaturization, component size reduction and component attribute modification.

There is provided, in accordance with a preferred embodiment of the present invention, a method for a website building system implemented on a server, the server having at least one processor and a memory. The method includes generating a representative component for each of a cluster of multiple components of a website of a user, based on an analysis of the attributes of the multiple components; and creating a dynamically modified user interface at least from the representative components for a visual editor of the website building system; where the generating and the creating change the dynamically modified user interface as the user edits the website; and where the visual editor includes a regular user interface and the dynamically modified user interface.

Moreover, in accordance with a preferred embodiment of the present invention, the regular user interface includes at least one regular menu hierarchy.

Further, in accordance with a preferred embodiment of the present invention, the method also includes generating and displaying the dynamically modified user interface.

Still further, in accordance with a preferred embodiment of the present invention, the method includes at least one of: modifying the regular user interface of the visual editor based on the use of the website components and associated third party applications; retrieving at least one of a promotional package and a marketing campaign for the dynamically modified user interface; and receiving edits to the website components from at least one of: a vendor of the website building system and the user.

Additionally, in accordance with a preferred embodiment of the present invention, the method also includes storing at least one of user information, website information; website editing history, business intelligence, templates, applications associated with the website and pre-defined information.

Moreover, in accordance with a preferred embodiment of the present invention, the dynamically generated user interface includes at least one dynamic variants area panel and where each at least one dynamic variants area panel includes at least one dynamic variants area section.

Further, in accordance with a preferred embodiment of the present invention, the generating a representative component includes filtering and classifying the website components on at least one of: a page and a partial page of the website; creating the cluster based on multi-dimensional attribute spaces and attributes of the website components; and determining the representative component from the cluster based on at least one of: geometric attribute parameters, average attribute dimensions and importance based criteria and creating the representative component based on at least one of: geometrical location, a mathematical function of dimensions and importance based criteria if the cluster has no representative component.

Still further, in accordance with a preferred embodiment of the present invention, the creating a dynamically modified user interface includes searching for query result components produced as a result of a user search request; building the at least one dynamic variants area section based on the representative components, the query result components, the pre-defined information and the templates; and generating final menu hierarchies based on the at least one dynamic variants area section.

Still further, in accordance with a preferred embodiment of the present invention, the generating and displaying of the dynamically modified user interface includes receiving the final menu hierarchies; receiving and applying styles from the user to components of the menu hierarchies; and placing the components of the menu hierarchies into the at least one dynamic area variants area section in a visual layout for menu selection; and running and displaying the menu hierarchies based on the receiving and applying styles and the placing.

Additionally, in accordance with a preferred embodiment of the present invention, the receiving and applying styles includes applying the styles to components within the same cluster of the representative component according to pre-defined cluster definitions.

Moreover, in accordance with a preferred embodiment of the present invention, the at least one dynamic variants area section includes an interface to a third party application.

Further, in accordance with a preferred embodiment of the present invention, the running and displaying of the menu hierarchies also includes performing modification to the components of the menu hierarchies and where the modifications are at least one of: component thumbnail creation, component miniaturization, component size reduction and component attribute modification.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
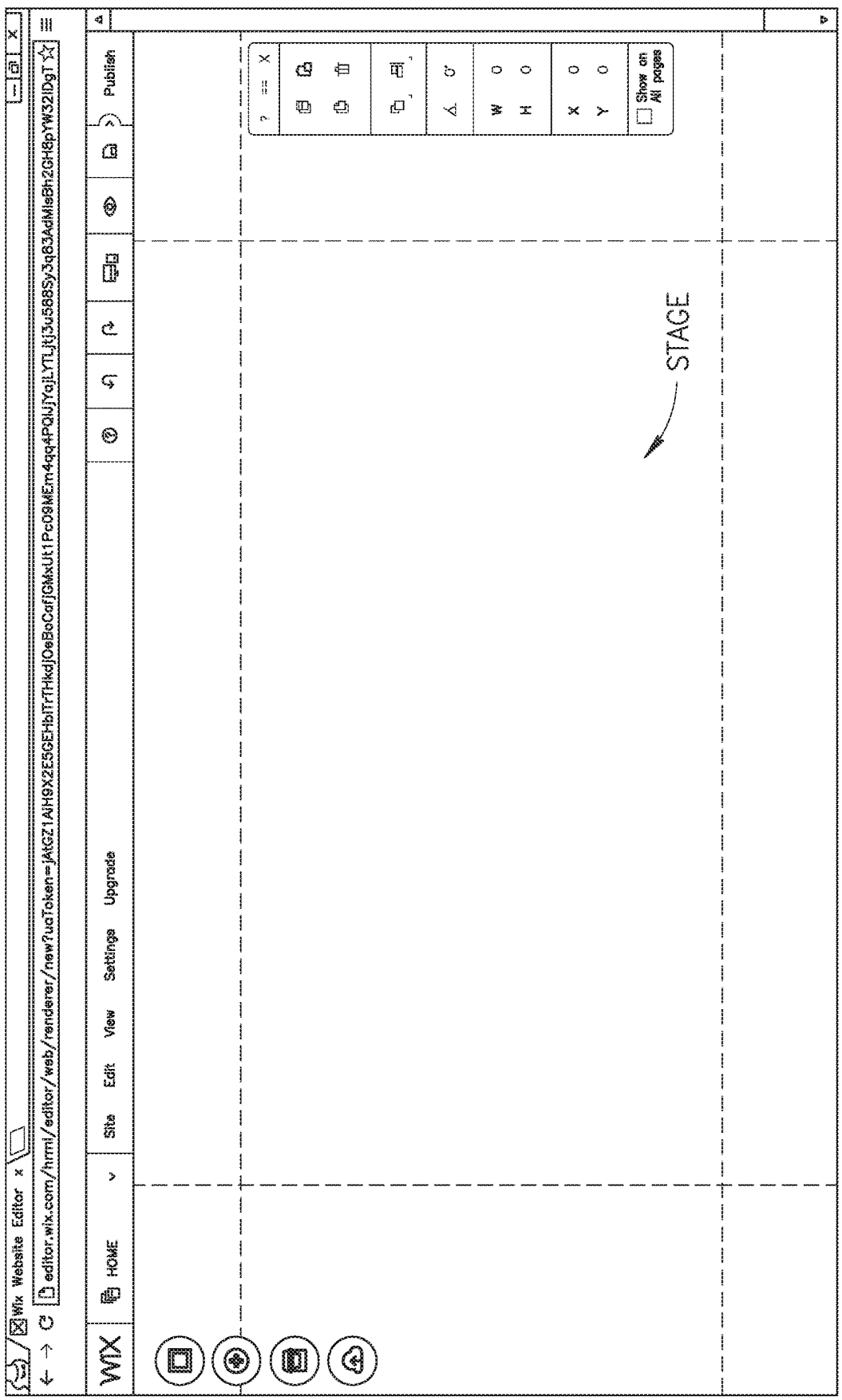
FIG. 1 is a screenshot of a basic website building system environment user interface.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that the "add component" option of existing systems, often adds a component with standardized attribute values (color, text font, shadow etc.) which has to be customized by the user. Novice users often do not perform this customization well, do not understand the multiple attribute setting options, and find it difficult to create aesthetic attribute combinations.

Applicants have also realized that users often find it difficult to create (or adapt) components so to create a consistently themed website, especially when attribute settings need to be conforming (but not identical) between different pages.

Existing systems typically provide a "recently used" option to help the user in creating a consistent theme among created objects (such as the "Recently Used Fonts" or "Recently Used Colors" which are found in some document editing systems). However, such systems are limited to objects which have very few attributes (e.g. a single-attribute font or color), whereas website building system component configurations may have dozens of attributes (making an existing "recently used" display unusable).

Furthermore, existing systems do not allow the user to view a summary of the design elements spread throughout the edited site (and not just the current page). Such a summary provides very useful hints to visually oriented users when attempting to create a consistent website design.

Applicants have realized that a solution to the above mentioned issues is a user interface (UI) which is adapted to the site being edited. Furthermore, the interface is updated as the site is modified. The resultant dynamically generated UI may be based on an analysis of the current site and the changes made to it (including in particular component style editing).

Applicants have further realized that this resultant dynamically generated UI provides a very individualized website experience for a very large amount of website building system users.

Figure 2:
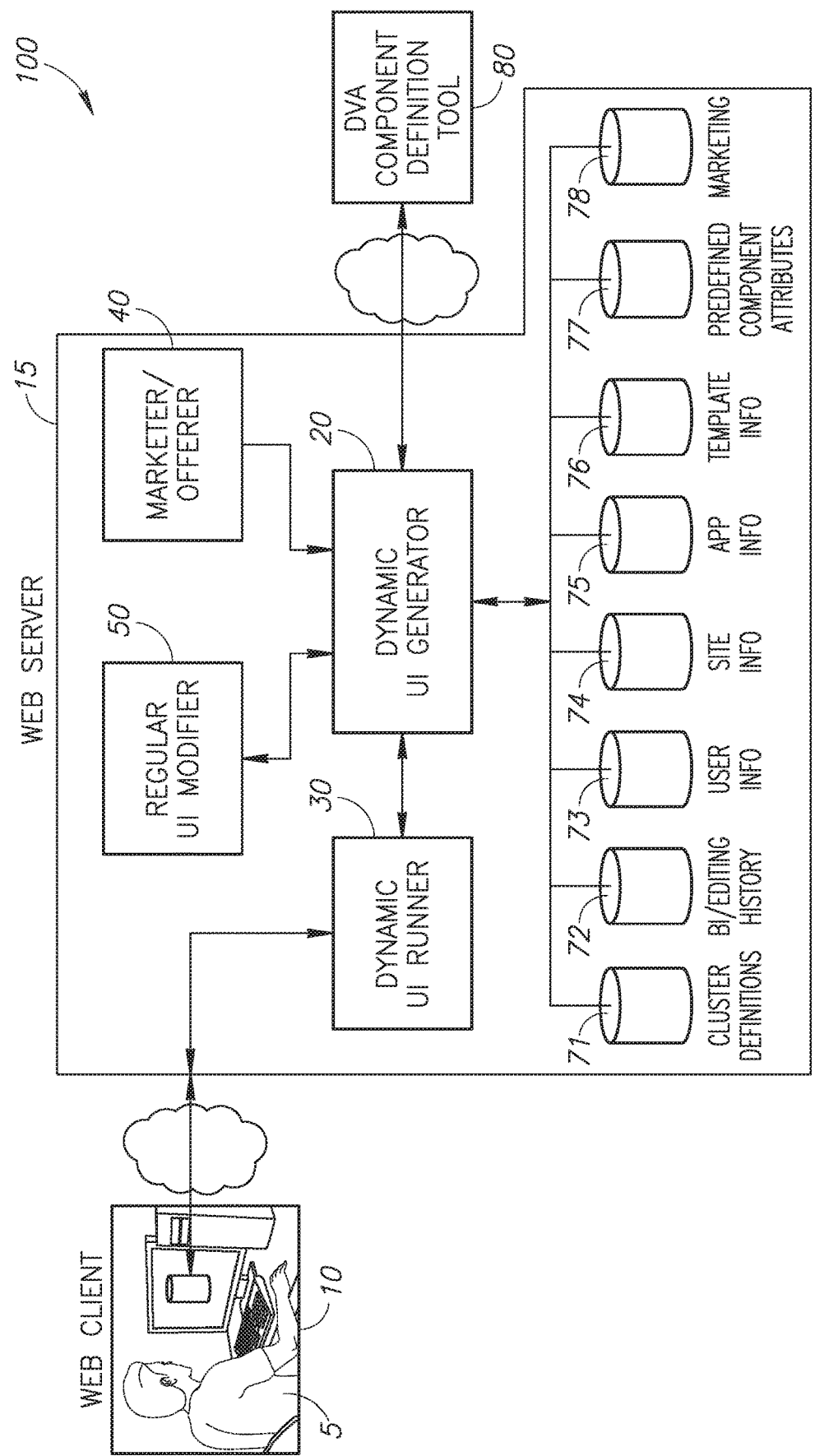
FIG. 2 is a schematic illustration of a system for generating dynamically generated menus for a website building system visual editor; in accordance with a preferred embodiment of the present invention.

Reference is now made to FIG. 2 which illustrates a system 100 for generating dynamically generated menus for a website building system visual editor. System 100 comprises a web client 10 and a web server 15. Web server 15 may further comprise a dynamic UI generator 20, a dynamic UI runner 30, a marketer/offerer 40, a regular UI modifier 50, a cluster definitions database 71, a BI editing history information database 72, a user info database 73, a site info database 74, an application info database 75, a template information database 76, a predefined component attributes database 77 and a marketing database 78.

As discussed herein above, a typical website building system may include a regular user interface which typically includes one or more rigid menu hierarchies. It will be appreciated that system 100 may create dynamically generated menus and thus a dynamically modified user interface to be used in addition to the regular user interface that is part of the visual editor.

It will be appreciated that databases 72-78 may be individual or may be part of a single logical database 70. BI editing history information database 72 may store information regarding editing history of the website and any gathered business intelligence information. User info database 73 may store information about the website building system user. Site info database 74 may store information about the actual website that the user is creating. Application info database 75 may store information regarding associated applications used within the website. Template information database 76 may store information about the templates used in the website. Predefined component attributes database 77 may contain preset configurations and preset dynamic variants area layouts recommended for use in general and marketing database 78 may store promotional packages and marketing campaigns provided by the website building system.

System 100 may also comprise a component definition tool 80 external to web server 15, connected to predefined component attributes database 77 which may allow the vendor of the website building system to define attributes for the components in use as described in more detail herein below. System 100 may also have a version of the component definition tool 80 accessible to regular system users, possibly integrating it with the website building system visual editor, or providing a simplified and/or user-oriented version of the component definition tool 80. Note that in case of use by a regular user, system 100 may store a user-specific version of the defined components (e.g. in a per-user section of the predefined component attributes database 77).

Website building system user 5 may work from web client 10. It will be appreciated that FIG. 2 is exemplary to an implementation with its main processing on a server. In an alternative embodiment, the main processing may take place on the client with the sever supplying basic web services which may allow access to the various databases. In another embodiment, the main processing may be divided between the client and the server, i.e. dynamic UI runner 30 may be installed on the client and dynamic UI generator 20 on the server. The division may be dynamically determined (i.e. based on parameters related to the user client device and the communication bandwidth). In yet another embodiment, a single machine that implements both processing and display may be used i.e. when system 100 is used locally in a desktop environment.

Figure 3:
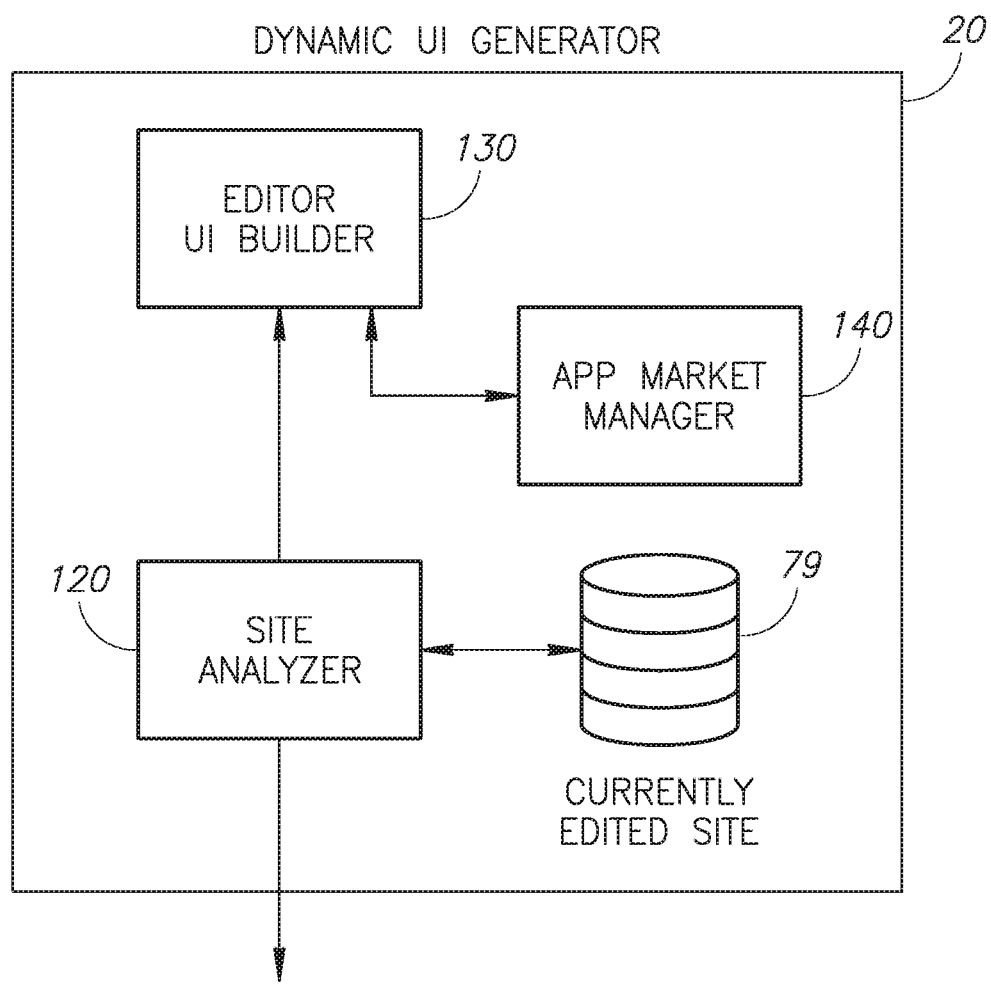
FIG. 3 is a schematic illustration of the elements of the dynamic UI generator of FIG. 2, in accordance with a preferred embodiment of the present invention.

Reference is now made to FIG. 3 which illustrates the elements of dynamic UI generator 20. Dynamic UI generator 20 may further comprise a site analyzer 120 which may analyze the components of the current website as stored in currently edited site database 79, an editor UI builder 130 and an application market manager 140. The function of these elements is described in more detail herein below.

Dynamic UI generator 20 may analyze the edited website and the changes made to it (including in particular component style editing) and using selected components, may create menus for the final user UI. The information extracted by UI generator 20 may be used by UI runner 30 to perform the actual UI generation, display and operation as described in more detail herein below. Dynamic UI generator 20 may take into account and integrate into the created menus any offers and promotions as provided by marketer/offerer 40. It may also take into account results from regular UI modifier 50 and offers from marketer/offerer 40 as well as any external component definitions made by the website building system vendor using DVA component definition tool 80 as described in more detail as herein below.

It will be appreciated that the final generated UI may include a dynamically generated dynamic variants area which displays panels presenting multiple variants of the available components from one or more component categories (presented using thumbnails or miniaturized versions as described in more detail herein below).

It will also be appreciated that although there is an infinite number of attribute value combinations, dynamic UI generator 20 may select specific components variations (to be presented in the dynamic variants area panel) based on attribute combinations which provide a high quality aesthetic experience. Thus user 5 may select components from the dynamic variants area panel for inclusion in the document (e.g. by using a UI button or by dragging and dropping), and may further adjust the attributes of the created component instances (e.g. to perform final adjustment for the created site).

Figure 4A:
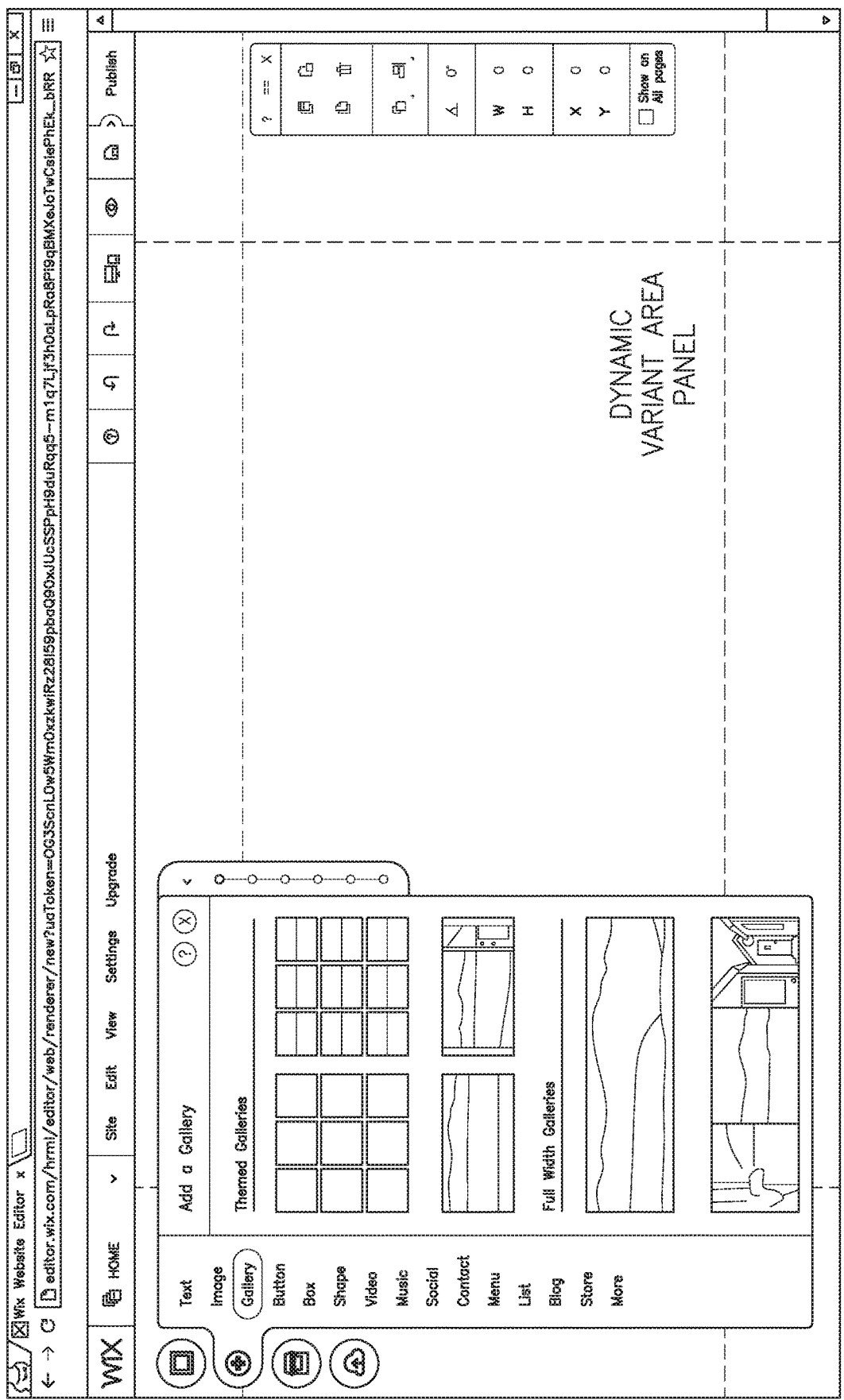
FIGS. 4A, 4B and 4C are screenshots of different examples of dynamic variants area panels; in accordance with a preferred embodiment of the present invention.
Figure 4B:
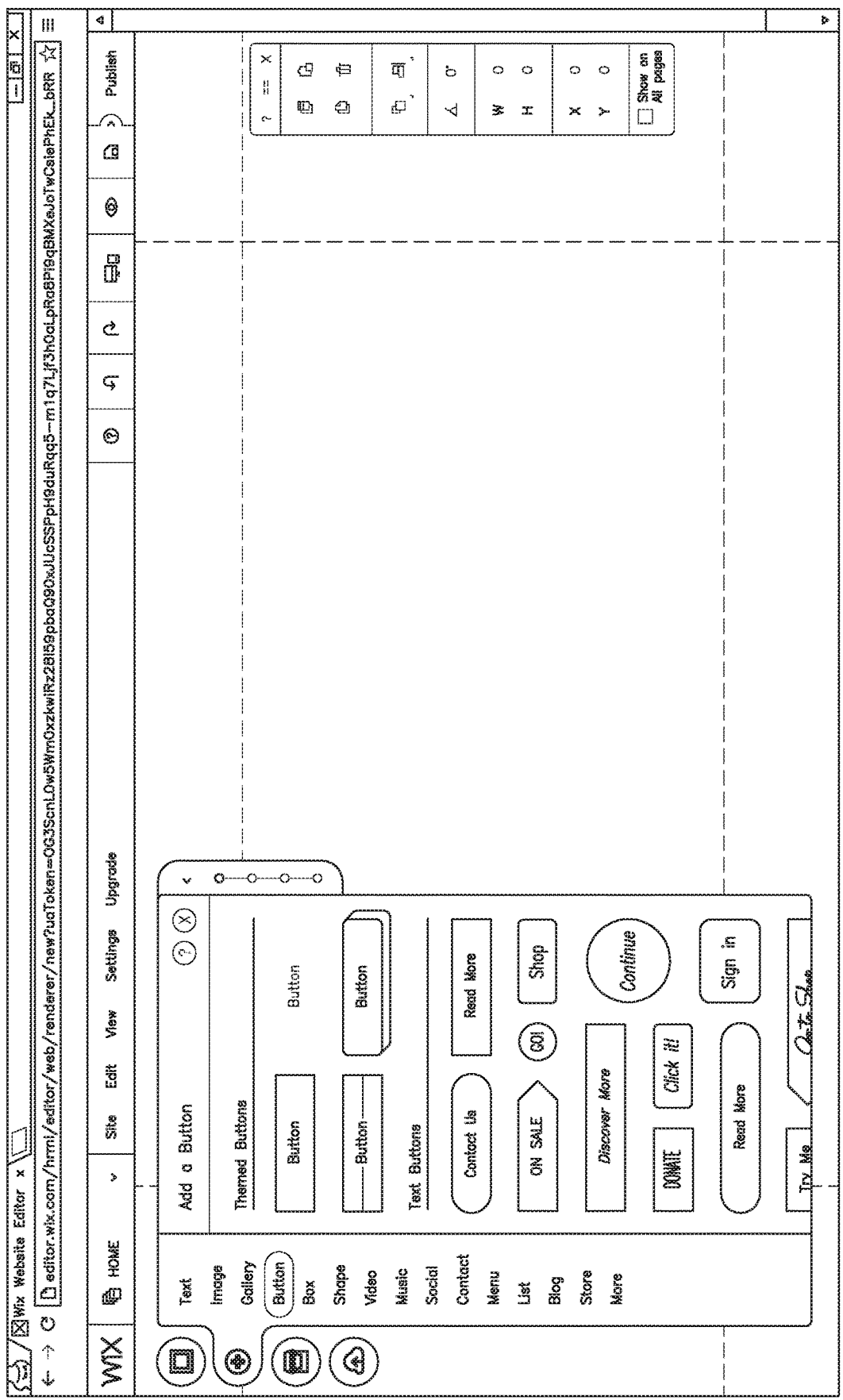
Figure 4C:
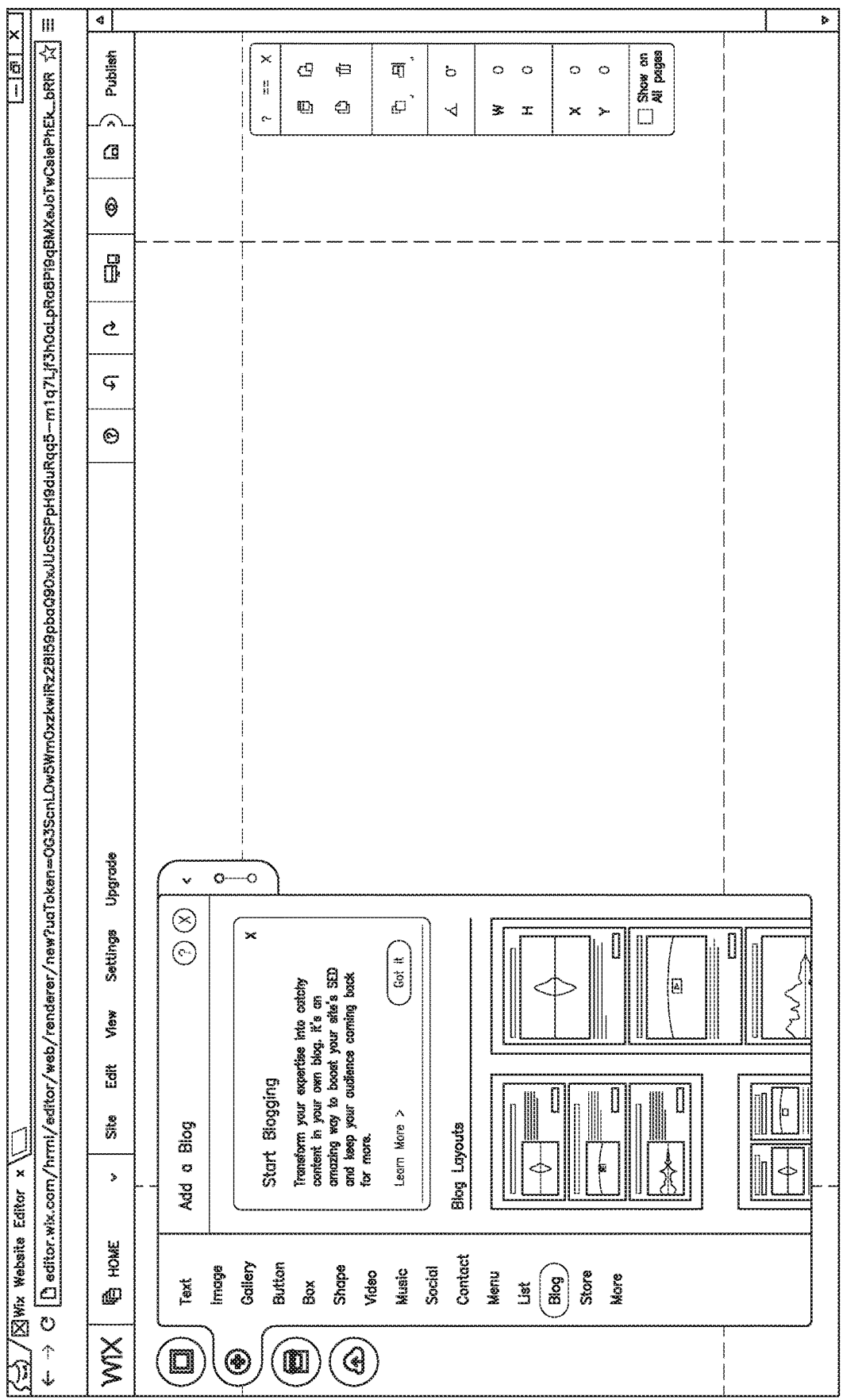

It will also be appreciated that the generated UI and the dynamically generated dynamic variants area may typically include multiple dynamic variants area panels to support the display of multiple component categories as is illustrated in FIGS. 4A, 4B and 4C to which reference is now made. FIG. 4A shows a gallery addition. FIG. 4B shows a button addition and FIG. 4C shows a blog addition.

Figure 5:
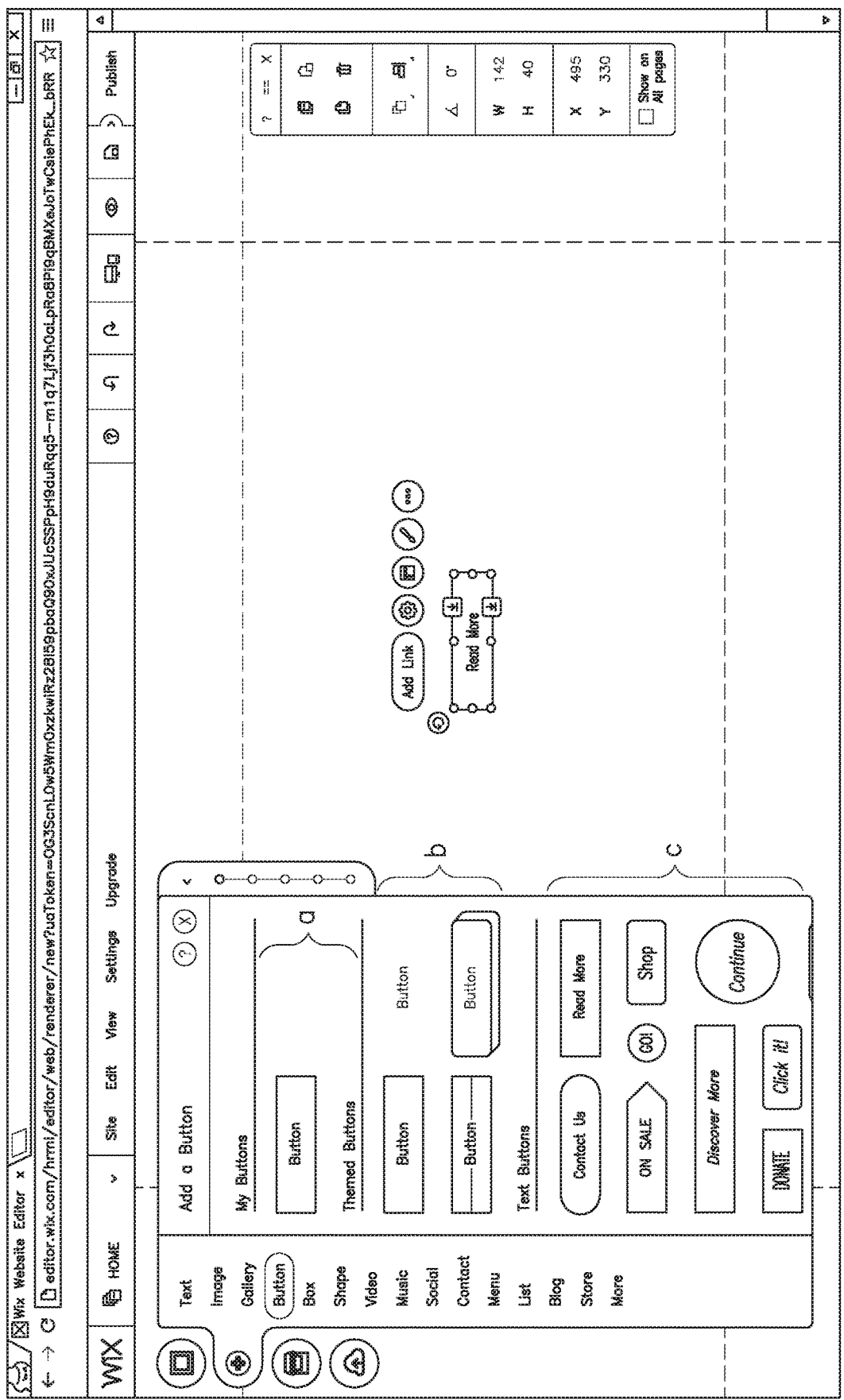
FIG. 5 is a screenshot of multiple dynamic variants area sections within a single dynamic variants area panel; in accordance with a preferred embodiment of the present invention.

A single dynamic variants area panel may typically be divided into dynamic variants area sections as illustrated in FIG. 5 to which reference is now made. FIG. 5 shows the "My buttons" (a), "Themed buttons" (b) and "Text buttons" (c) sections. Each dynamic variants area panel has its own set of sections (e.g. the "Add Button" panel has its own sections, separate from that of the "Add Gallery" panel).

Figure 6A:
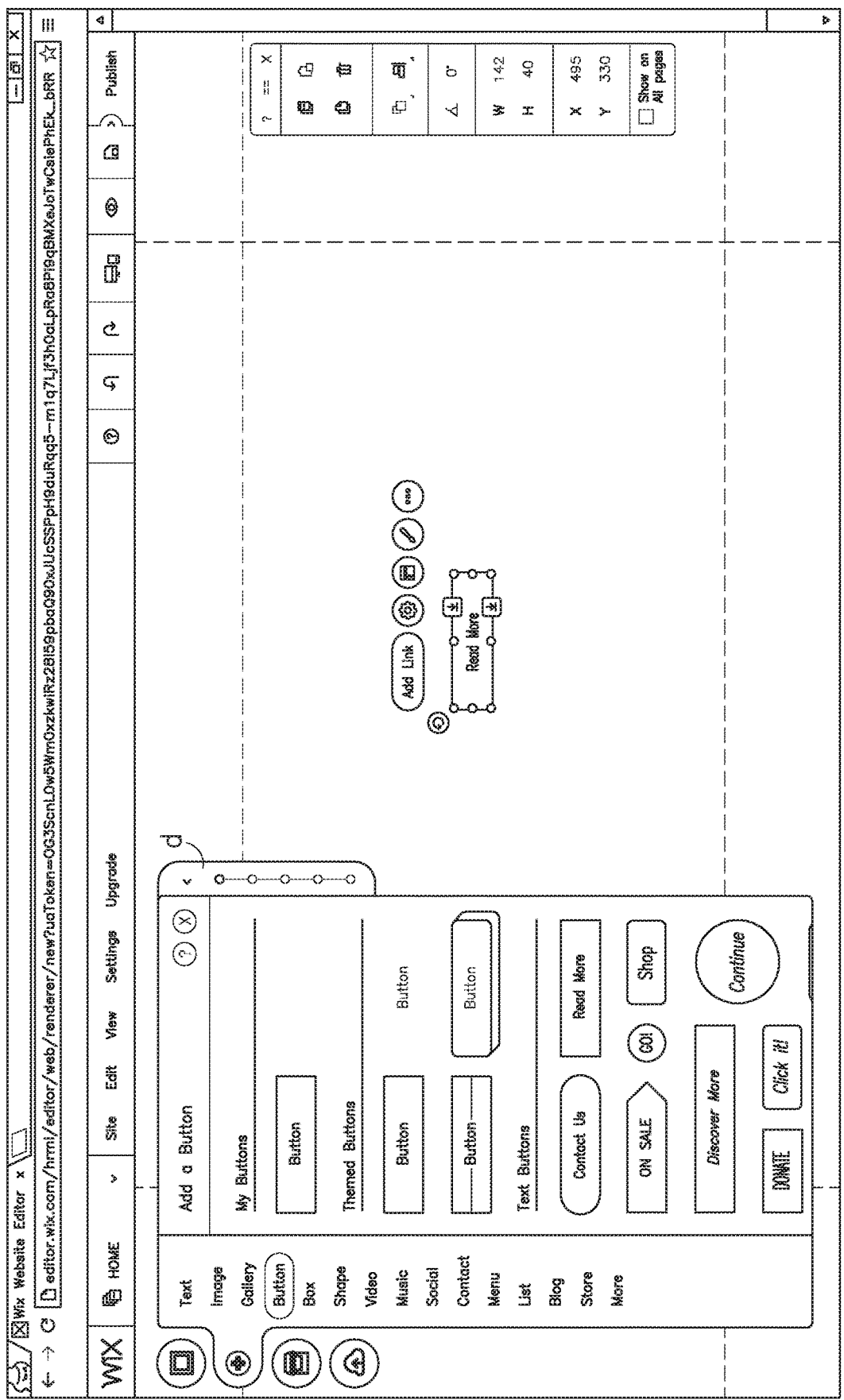
FIGS. 6A and 6B are screenshots of a dynamic variants area section navigation side menu without and with section name display; in accordance with a preferred embodiment of the present invention.
Figure 6B:
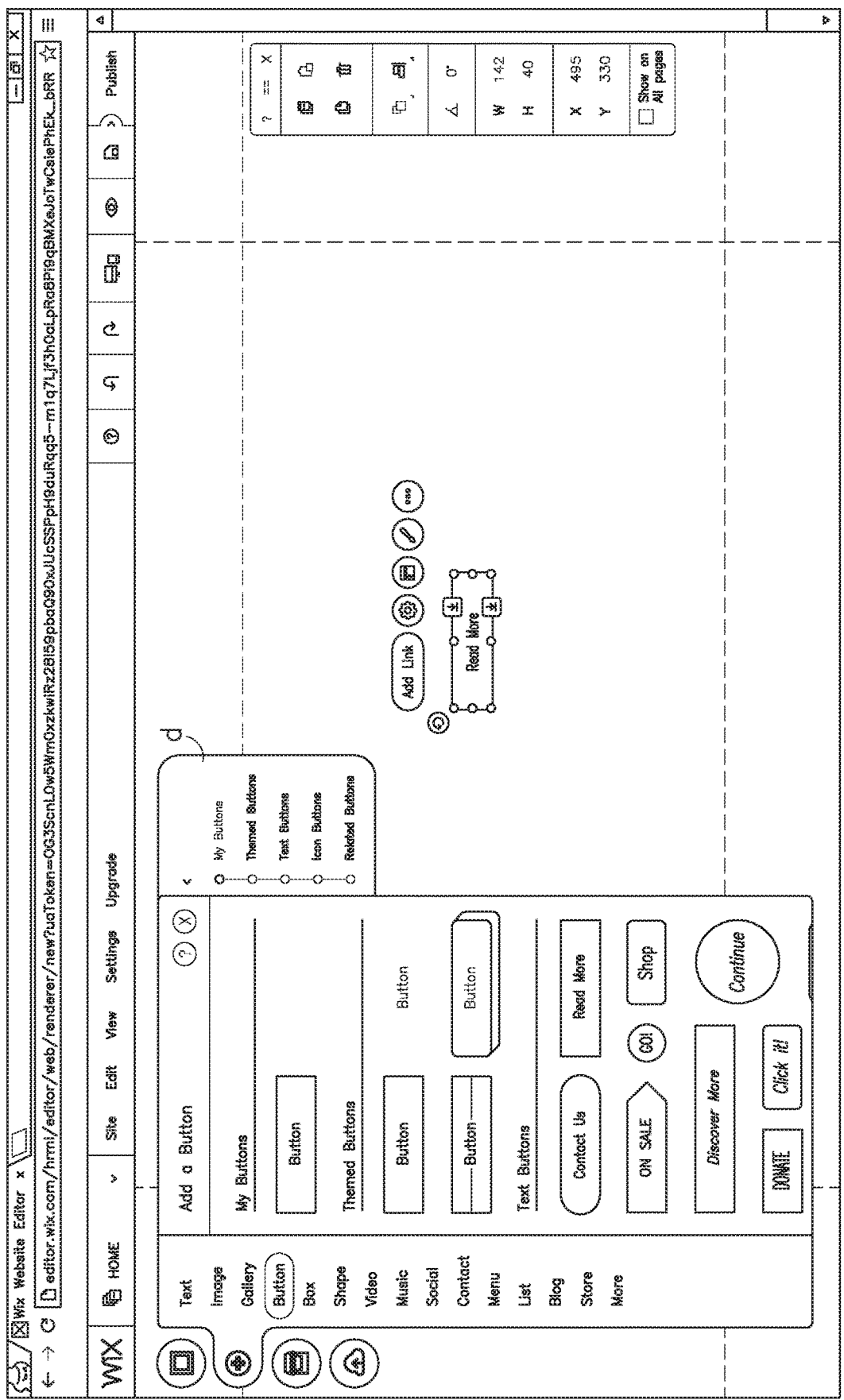

Such sections may be created (and populated with components) in different ways as further described herein below. The dynamic variants area UI may also offer a navigation mechanism which allows user 5 to quickly navigate between the dynamic variants area sections (as is illustrated in FIGS. 6A and 6B which show a side-menu (d) allowing navigation, with and without a section name display).

Figure 7:
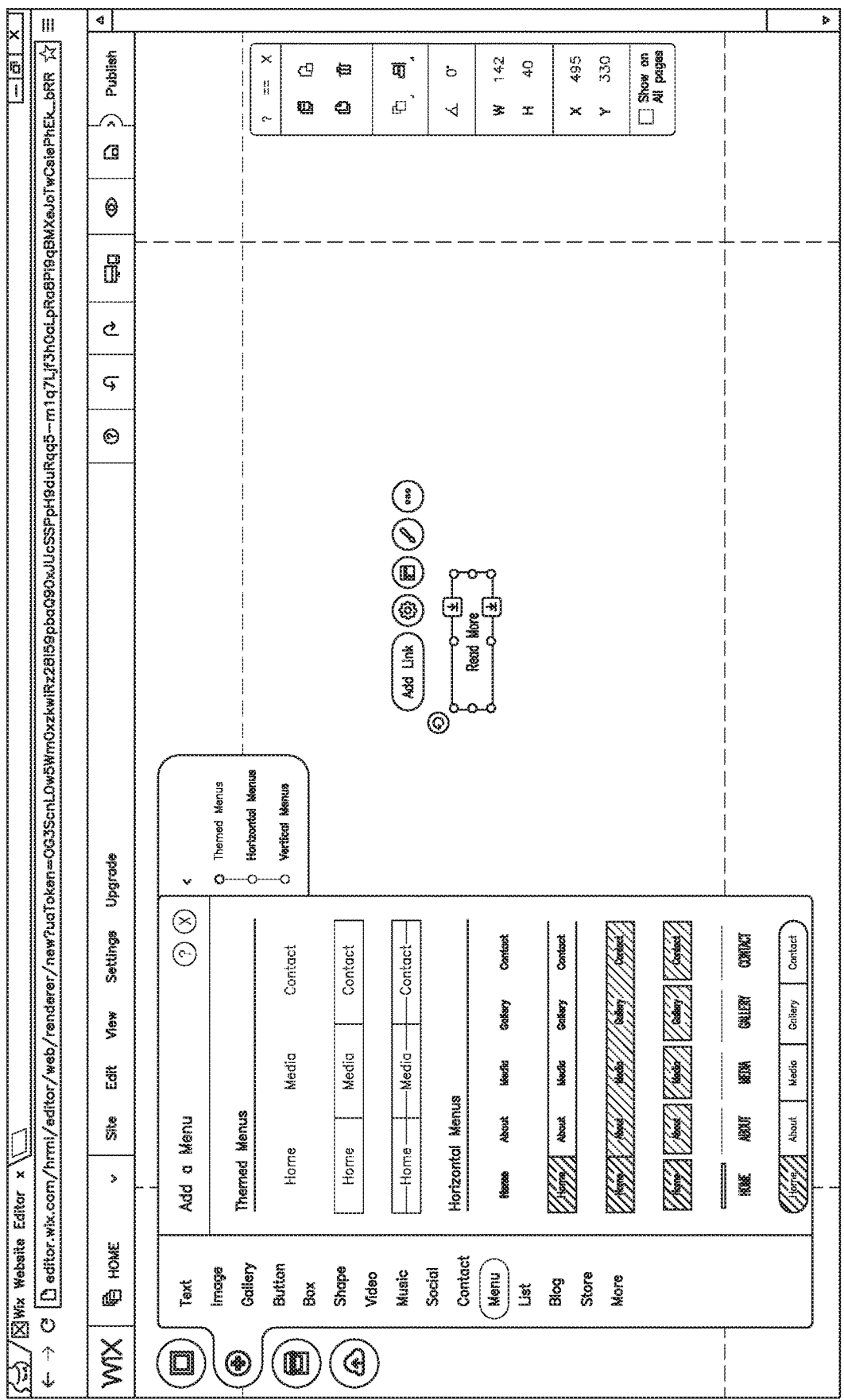
FIG. 7 is a screenshot of a dynamic variants area with sections including components of the same type; in accordance with a preferred embodiment of the present invention.
Figure 8A:
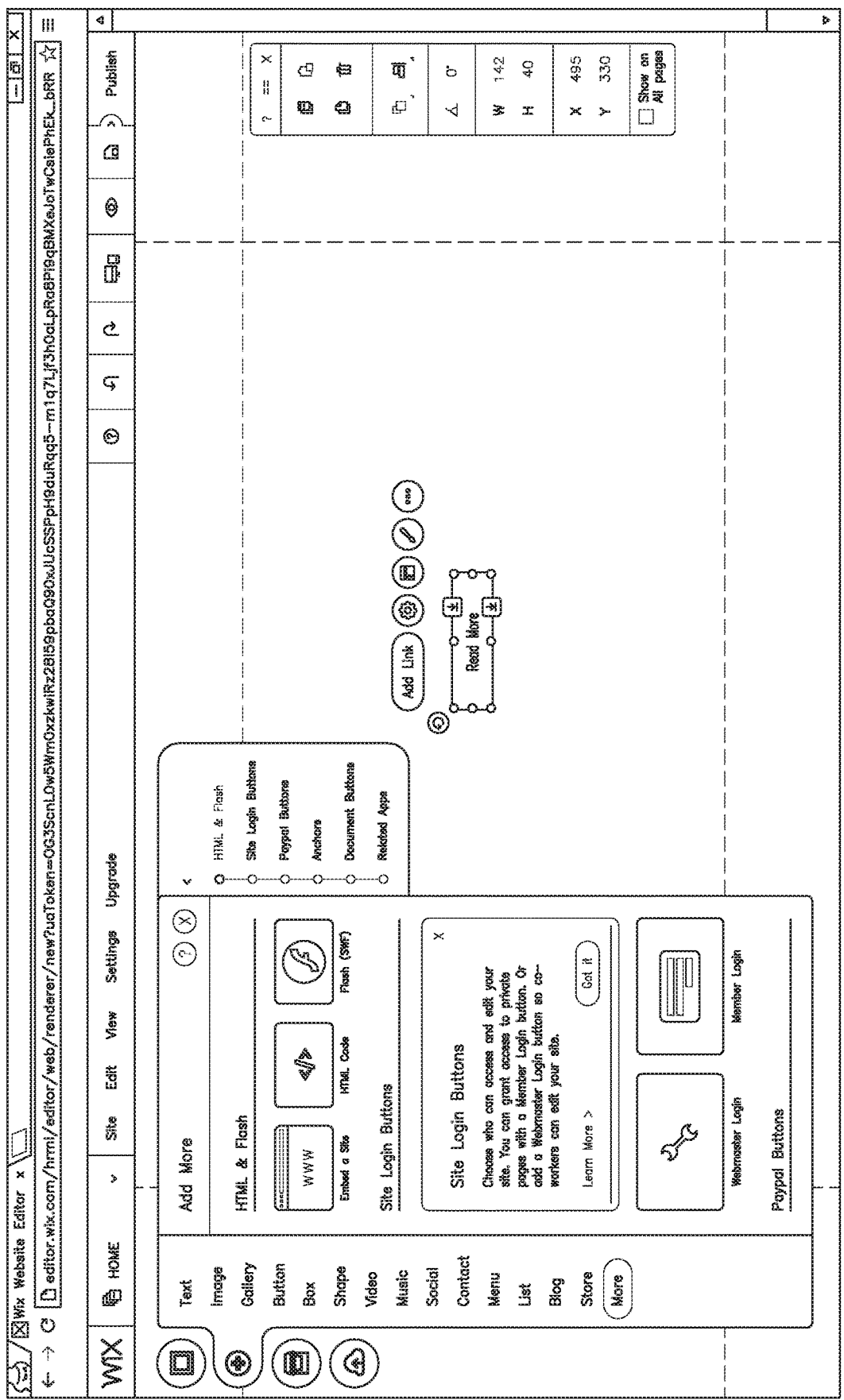
FIG. 8A is a screenshot of a dynamic variants area with sections including components of different types; in accordance with a preferred embodiment of the present invention.

A single dynamic variants area panel may display components of a single type or class of similar types as is illustrated in FIG. 7 to which reference is now made, in which all sections include just menu components. Alternatively, a single dynamic variants area panel may include multiple components classes as illustrated in FIG. 8A to which reference is now made which shows a dynamic variants area panel which includes sections displaying components of multiple types.

Figure 8B:
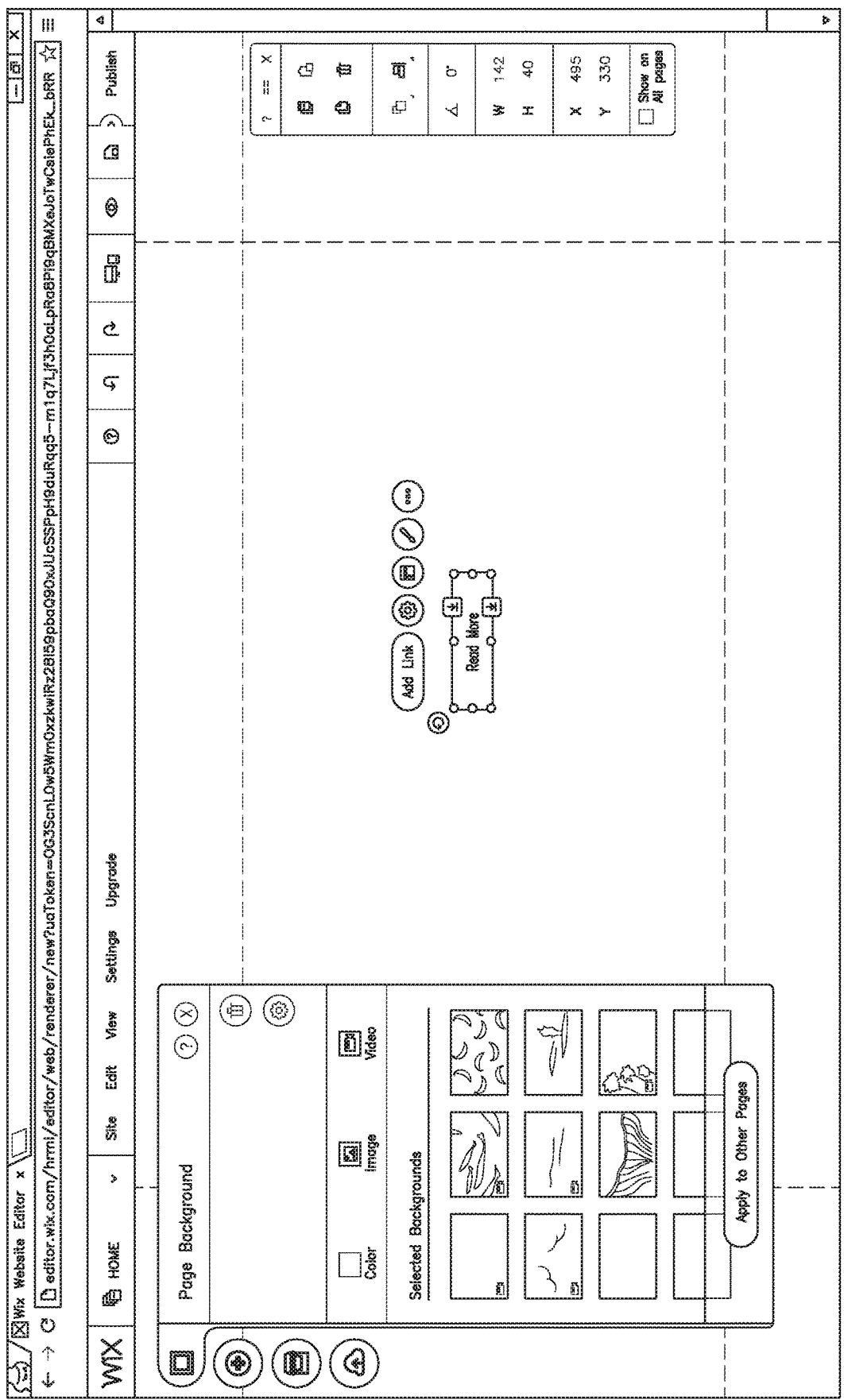
FIG. 8B is a screenshot of a dynamic variants area panel with non-component content; in accordance with a preferred embodiment of the present invention.

The dynamic variants area may also display variations for non-component website page elements, such as variants and dialog for the page background as is illustrated in FIG. 8B to which reference is now made.

Figure 9:
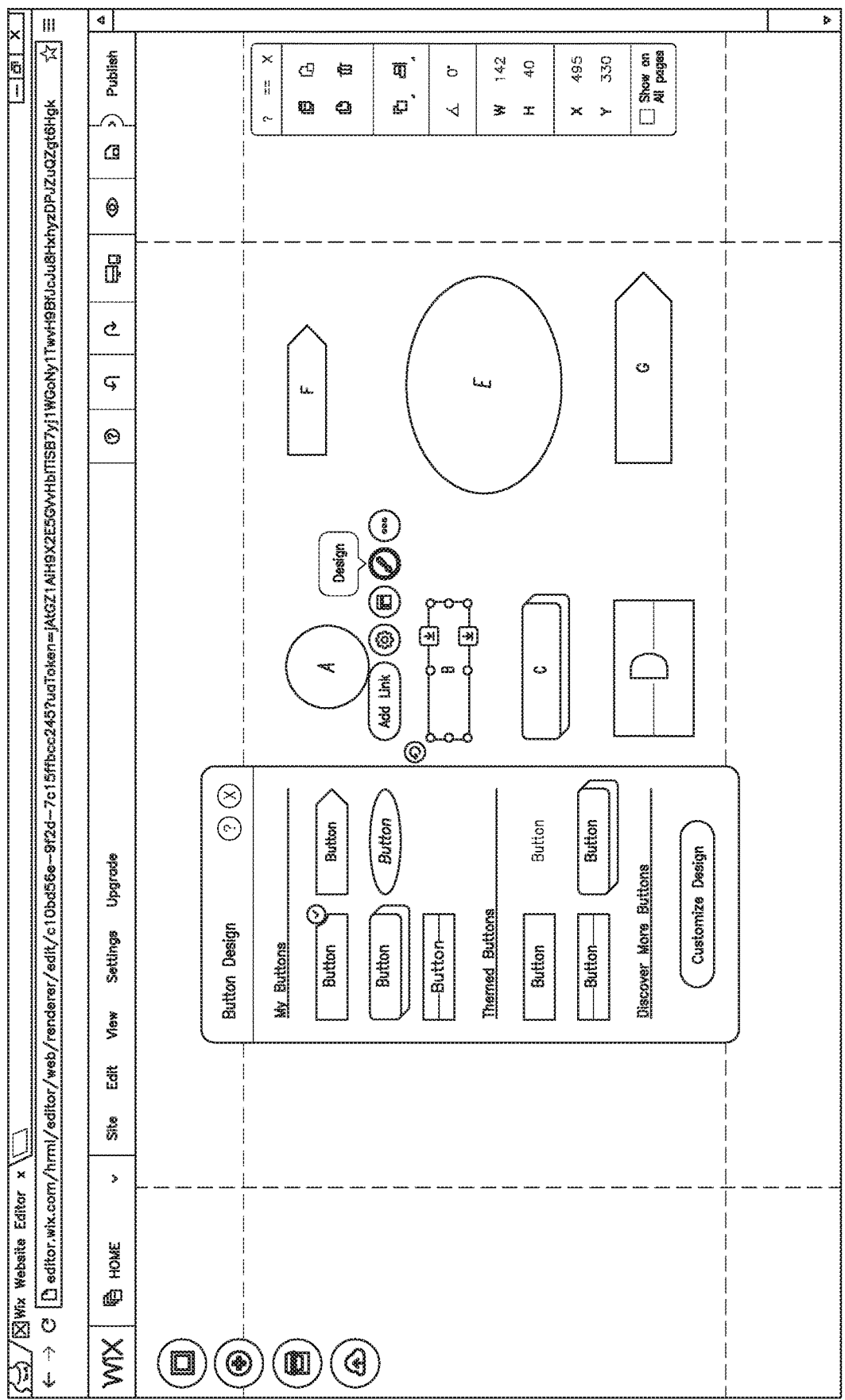
FIG. 9 is a screenshot of a pop-up dynamic variants area panel with a specific component type; in accordance with a preferred embodiment of the present invention.

Dynamic UI generator 20 may also generate a pop up dynamic variants area panel for a specific component when selecting a component and editing its style as illustrated in FIG. 9 to which reference is now made. This may be in addition to displaying the dynamic variants area panel when using the system menu hierarchy.

It will also be appreciated that the dynamic variants area panels for different component types may expose a different variety of components and related settings UIs. For example, the "Add Text" dynamic variants area panel may include numerous text variations demonstrating various fonts, text effects and text related features and would thus be different and more complex than (for example) a "My Shapes" dynamic variants area panel.

Dynamic variants area section types may include a "My Site" section, a "Themed Section", a "Presets" section and a search results section.

The "My Site" section may consist of components representing configurations used in the site either directly or through a representative component.

The "Themed" section may contain component configurations associated with a template used by the site. The association is typically created by the designers of the templates, though the website building system may provide a tool to create or edit such associations which may be used by third parties which are not the template creators. The association is typically made with a full site template used for the creation of the entire site. However, a site may include multiple templates (e.g. page template, page section templates etc.).

Dynamic UI generator 20 may allow each such template to provide its own associated component configurations. In such a case, system 100 may create the per-panel "Themed" section by merging the associated component configuration lists associated with each of the relevant templates (using all templates in the site, or possibly limiting to the templates relevant to the current context, e.g. the current page being edited). As discussed herein above, system 100 may remove a given component configuration from the "Themed" and move it to "My Site" upon use or upon modification by user 5.

The "Presets" section may include a set of one or more sections of components representing configurations recommended for use in general. It will be appreciated that dynamic variants area panel may include one or more "Presets" sections. These sections include components of multiple types presented with specific style configurations which are considered aesthetic. System 100 may use component definitions included in pre-defined component attributed database 77 to construct such "Presets" sections.

Figure 10:
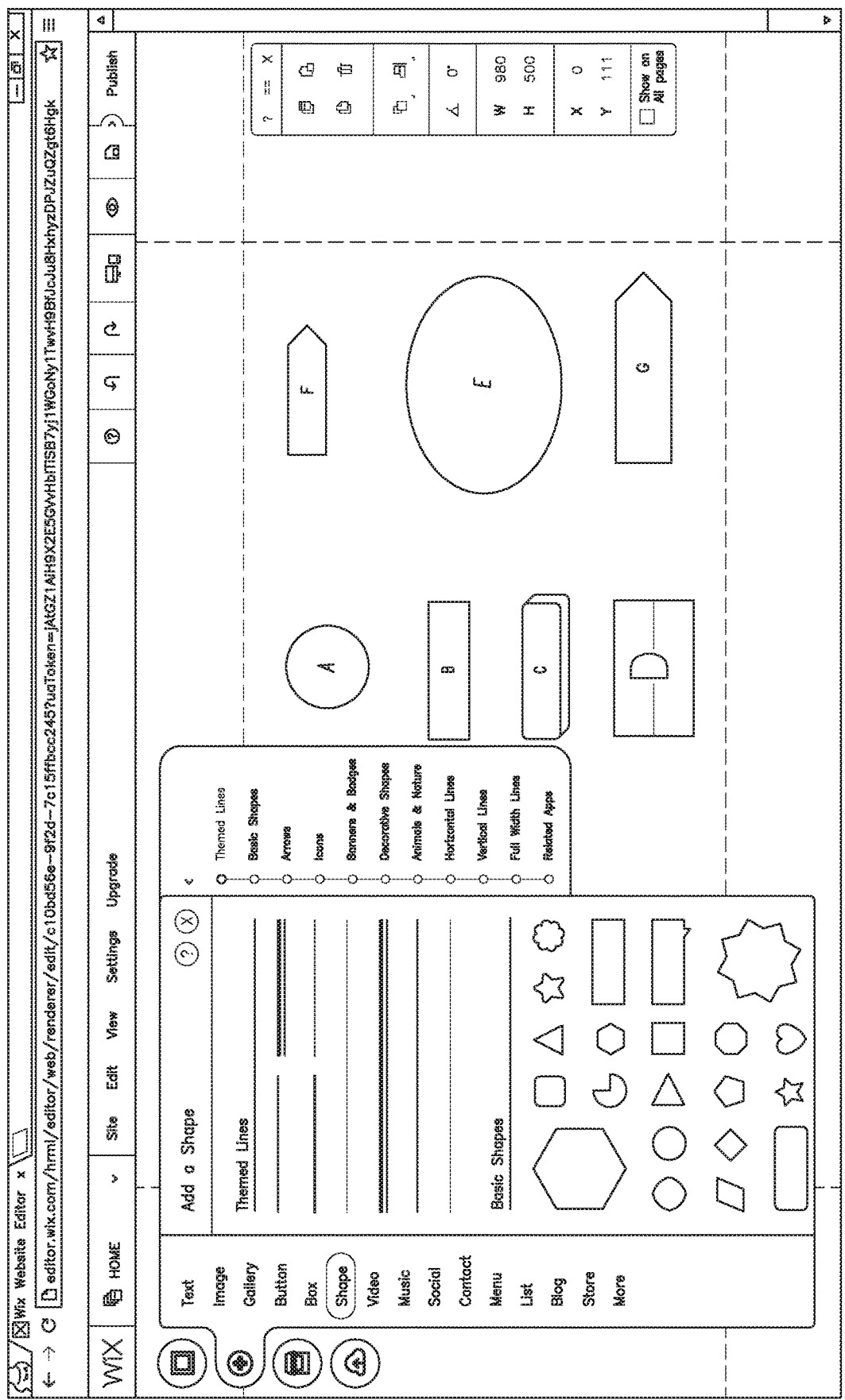
FIG. 10 is a screenshot of a dynamic variants area panel with multiple "Presets" sections; in accordance with a preferred embodiment of the present invention.

Reference is now made to FIG. 10 which illustrates an "Add a Shape" dynamic variants area panel containing numerous types of shapes and shape configuration (e.g. basic shapes, arrows, icons, banners and badges etc.). The availability of a single panel displaying multiple objects with high quality style configurations may allow user 5 to quickly select appropriately configured components for his website, and minimize the need for additional adjustments and tailoring.

Such configurations may be manually selected (e.g. by a professional designer employed by the website building system vendor), or through an algorithm which generates style combination according to a pre-defined visual criteria. Such visual criteria may also be defined through a crowd-sourcing process, i.e. by extracting layout parameters from multiple websites (created by the website building system or otherwise), possibly selecting websites for analysis based on some success or quality criteria. It will be appreciated that a single website building system panel may contain "Presets" sections containing components of multiple general types (such as the "Related Apps" section in FIG. 11).

The search results section may be added dynamically as a result of a query run by user 5. It will be appreciated that the search may apply to the components displayed in the various sections of the dynamic variants area panel and may generate a set of query result components. The search may include any combination of: specifying which sections should be included (all or specific sections), specifying metadata field values (e.g. using a query form), specifying search keywords, this may apply to non-textual components (e.g. pictures) through associated descriptive text or content analysis (e.g. picture content analysis) and specifying style related parameters (e.g. only if font>12 pt).

Dynamic UI generator 20 may use the search criteria to filter the existing components and display in each dynamic variants area section only the matching components for the set of query result components. Searching may be limited to representative components only (when relevant) or may include all found components (including non-representative ones). Alternatively, a dynamic variants area may add a "search results" section which includes the matching components found.

Figure 11:
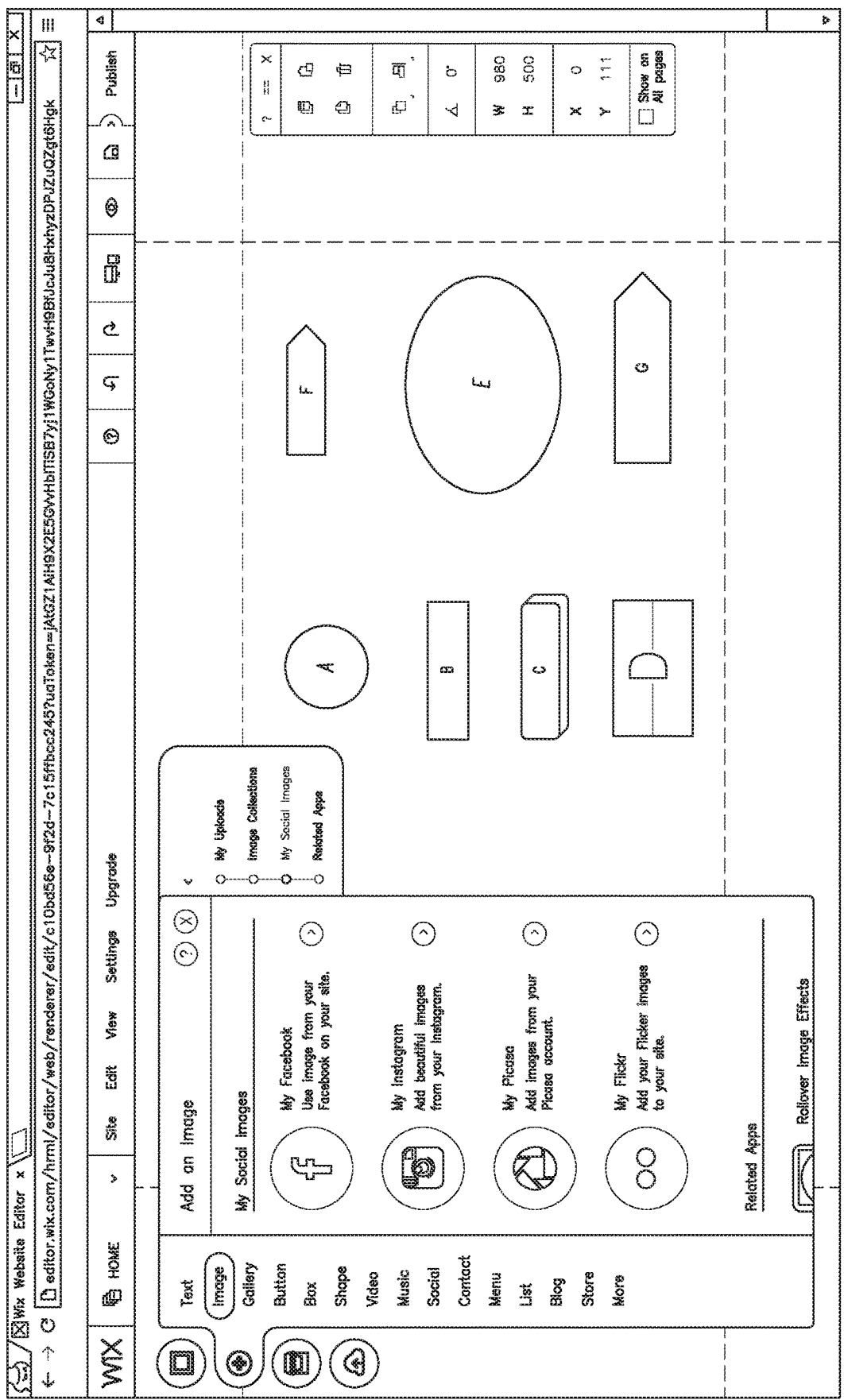
FIG. 11 is a screenshot of a dynamic variants area section linking to external image sources; in accordance with a preferred embodiment of the present invention.

Other additional section types may include a retrieved data section. This is a section which reflects variable data available in an external CMS or data repository. For example, a "My Uploaded Images" section may display a set of images loaded by the specific user. Another section type may be links to media/components sources which provides additional media or components. Examples may include a UI which operates a link to an external image provider (such as Picasa or Flickr) which can be used by user 5 in his site such as is illustrated in FIG. 11 to which reference is now made.

Other section types may further include links to external systems, this is a section which includes an external system (such as a third party application as described above) operating within the section area and an advertising section. This is a section devoted to one more elements of advertising content, typically relevant to the dynamic variants area panel type. Such content may advertise the website building system vendor or third parties. For example, a dynamic variants area panel devoted to e-Commerce related elements may include an advertising area displaying advertising related to services to small businesses.

Other sections further include third party sales and/or AppStore, a section devoted to sales of third party applications in general, or of "related apps" specifically related to a dynamic variants area panel major theme and training material, a section devoted to displaying training material on how to use a given class of components or component configurations. Such material may include a video segment or a mini-training application.

Finally there may also be a supporting UI section devoted to displaying other system features not directly related to components, e.g. a mailing list manager dynamic variants area section inside a "contact form related" dynamic variants area panel as well as user defined sections. It will be appreciated that system 100 may allow user 5 to create user-defined sections. These could be limited to a single dynamic variants area panel, or added to some or all dynamic variants area panels. User 5 may then be able to specify that a given component with a given configuration would be saved in such a user defined section. This can be done using DVA component definition tool 80 as described in more detail herein below.

It will be further appreciated that components may be "moved" or "copied" between sections over time. For example, when a component offered in the "Themed" section is actually used in the edited site; dynamic UI generator 20 may move or copy the component to the "My Site" section.

Thus the general structure of a dynamic variants area panel may change over time. For example, when editing a blank site (i.e. starting without a site template), the "Add button" dynamic variants area panel may initially appear without a "My Site" section. Once a button is added to the site, subsequent invocations of the "Add button" dynamic variants area panel would include the "My Site" section.

Dynamic UI generator 20 may also generate additional dynamic variants area panel types which are not focused on a single component type or category. For example, it may offer a "site kit" dynamic variants area panel which includes the "My Site" dynamic variants area sections for all component types (i.e. "My Buttons", "My Lines", etc.). This way, the "site kit" dynamic variants area panel may summarize all building blocks used in the current site in a single panel.

Many of the components displayed in the various dynamic variants area sections contain text strings (e.g. buttons containing a default label). Thus, system 100 may be required to support multiple variants of the underlying dynamic variants area data translated to the languages supported by the website building system.

It will be appreciated that FIGS. 4-11 and 13A and 13B may all be based on a model in which the dynamic variants area sections are organized one above the other in the dynamic variants area. In an alternative embodiment, system 100 may implement any kind of section arrangement, such as a 2-dimension grid, a horizontal grid (with slide right/left options) and a flipbook UI (e.g. displaying one section at a time) etc.

Figure 12A:
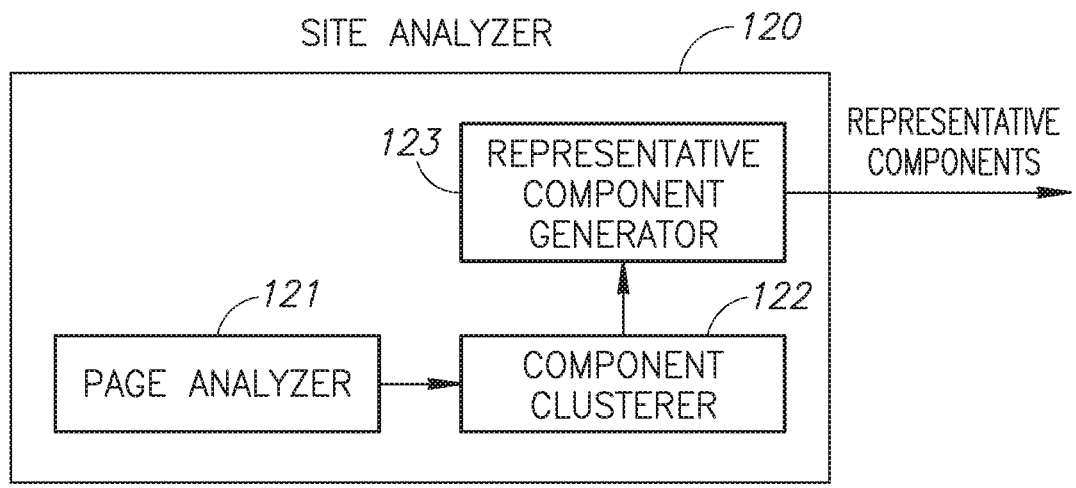
FIG. 12A is a schematic illustration of the elements of the site analyzer of FIG. 3; in accordance with a preferred embodiment of the present invention.
Figure 12B:
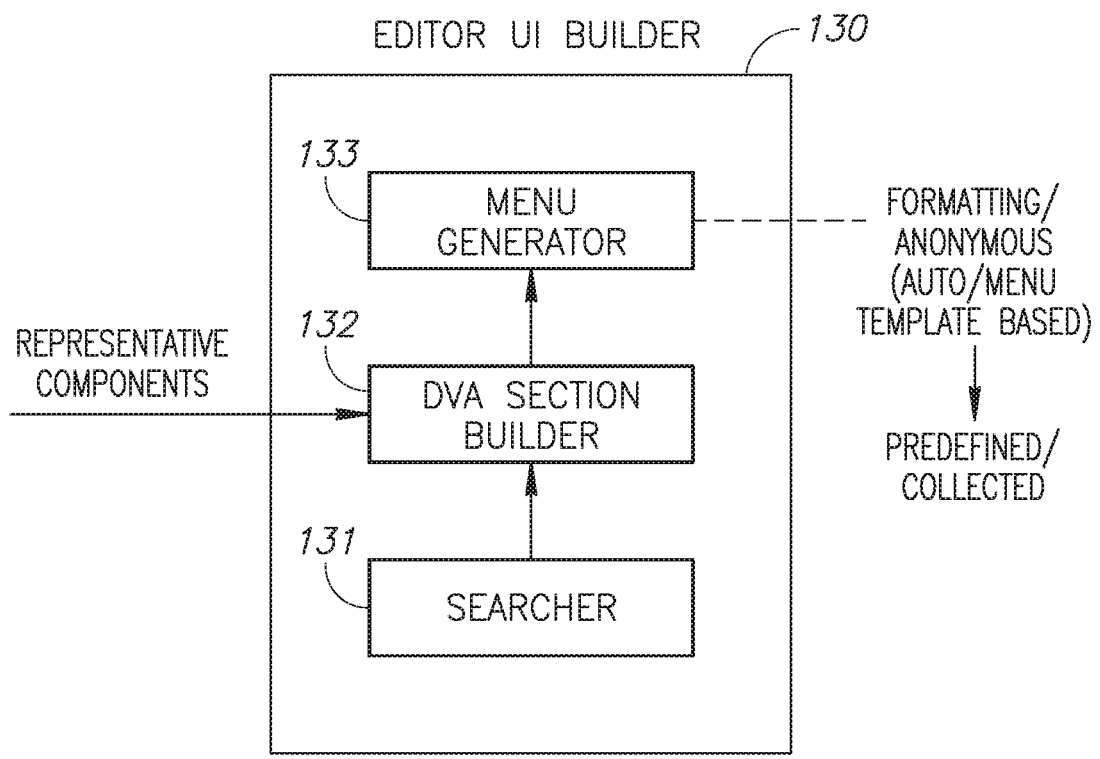
FIG. 12B is a schematic illustration of the elements of the editor UI builder of FIG. 3; in accordance with a preferred embodiment of the present invention.

Reference is now made to FIGS. 12A and 12B which illustrate the components of site analyzer 120 and editor UI builder 130. Site analyzer 120 comprises a page analyzer 121, a component clusterer 122 and a representative component generator 123. Editor UI builder 130 comprises a searcher 131, a DVA section builder 132 and a menu generator 133.

Page analyzer 121 may scan the components either across the entire website or within a limited part of it (e.g. single page or a single container) depending on a request made by user 5 and may then extract the relevant components including components found inside containers. User 5 may invoke the general-purpose editing UI, or a UI adapted to editing of a specific component or group of components. It will be appreciated that page analyzer 121 may not only scan the current website components, but may also extract other relevant components based on user information, BI and editing history, other websites belonging to the same user, associated applications, predefined components and relevant template information etc. as stored on databases 71-78.

Page analyzer 121 may then filter out irrelevant components (e.g. components which have no visible representation such as back-office third party applications) and organize these components according to component classes. Each class may include the components which would be shown together in a single "My Site" dynamic variants area section. The class list may be similar but not identical to the dynamic variants area panels list. It will be appreciated that some dynamic variants area panels do not have a "My Sites" section, and single "site kit" dynamic variants area panel may contain multiple "My Sites" type sections.

For each dynamic variants area panel, site analyzer 120 may loop on the list of dynamic variants area sections to be included in the particular panel based on a set of internal definitions included in the site analyzer 120 (e.g. "Add button panel always has section X, Y and Z"). As discussed herein above, there are different dynamic variants area section types.

For a "My Sites" section (for example), page analyzer 121 may create a set X consisting of the components extracted for the specific "My Sites" section (e.g. buttons extracted for a "My Buttons" section) through the processes of filtering, classifying etc. as described herein above.

Component clusterer 122 may then divide the extracted and filtered component set into a set Y of multiple clusters of like components based on multi-dimensional attribute space or other attribute analysis methods as described in more detail herein below. Representative component generator 123 may select and/or create the final set of components to be used by editor UI builder 130 which may then create a displayed version Z arranged as required. Once the required layout has been created, dynamic UI runner 30 may perform the actual UI generation, display and operation as discussed in more detail herein below for the displayed version Z.

As discussed herein above, the "My Site" section consists of components representing component configurations used in the site. The discussion below describes the creation of the "My Site" dynamic variants area section for a user wishing to create one or more buttons. It will be appreciated that the same process may also be applied to other section types.

In existing systems of the prior art, in order to create a button, user 5 would either have to take a basic ("undesigned") button from the current system, having default button parameters, and re-design it or take a button from the site (or other) template, and customize ("re-design") it until it fits.

It will be appreciated that by using system 100, user 5 may invoke an "Add Button" dynamic variants area section panel. This dynamic variants area section panel may include a dynamically-built "My Site" dynamic variants area section ("My Buttons") containing the buttons existing in the current website together with their specific modifications and adaptations. Editor UI builder 130 may omit buttons which were copied from the available button designs but whose style was not modified. Non-style changes (such as position, size, label text, button action etc.) are not considered in this case.

It will also be appreciated that user 5 may also create a new component configuration during the design but then remove this configuration (e.g. by editing the component into a new configuration or by removing the component altogether). In such a case, the configuration becomes an unused configuration.

Site analyzer 120 may remove the unused configuration immediately (i.e. as soon as it becomes unused), at the end of the current editing session, or during a garbage collection phase performed automatically or invoked by user 5 as discussed in more detail herein below.

It will be appreciated that one advantage in leaving the configuration available for a longer period of time (in the present UI) even after it is no longer in use, is because user 5 may be experimenting with multiple designs, and this way he would be able to re-use such the specific design even if it became unused at a given moment.

It will be further appreciated that components may have multiple style configurations due to the existence of multiple components states as discussed herein above (e.g. pressed and un-pressed states for buttons).

When creating the "My Buttons" section, component clusterer 122 may "merge" multiple button designs (used in the current website) which have different parameters. This may be done using any multi-dimensional clustering algorithm known in the art, which may cluster the different button designs in the multi-dimensional attribute space. Representative component generator 123 may then determine a representative component for each such cluster (representative buttons in the current example). It will be appreciated that if no suitable representative component exists for a particular cluster, representative component generator 123 may generate one as described in more detail herein below. It will also be appreciated that clusterer 122 may implement clustering algorithms which determine (i.e. select or generate) more than one representative component for a single cluster under some conditions.

Figure 13A:
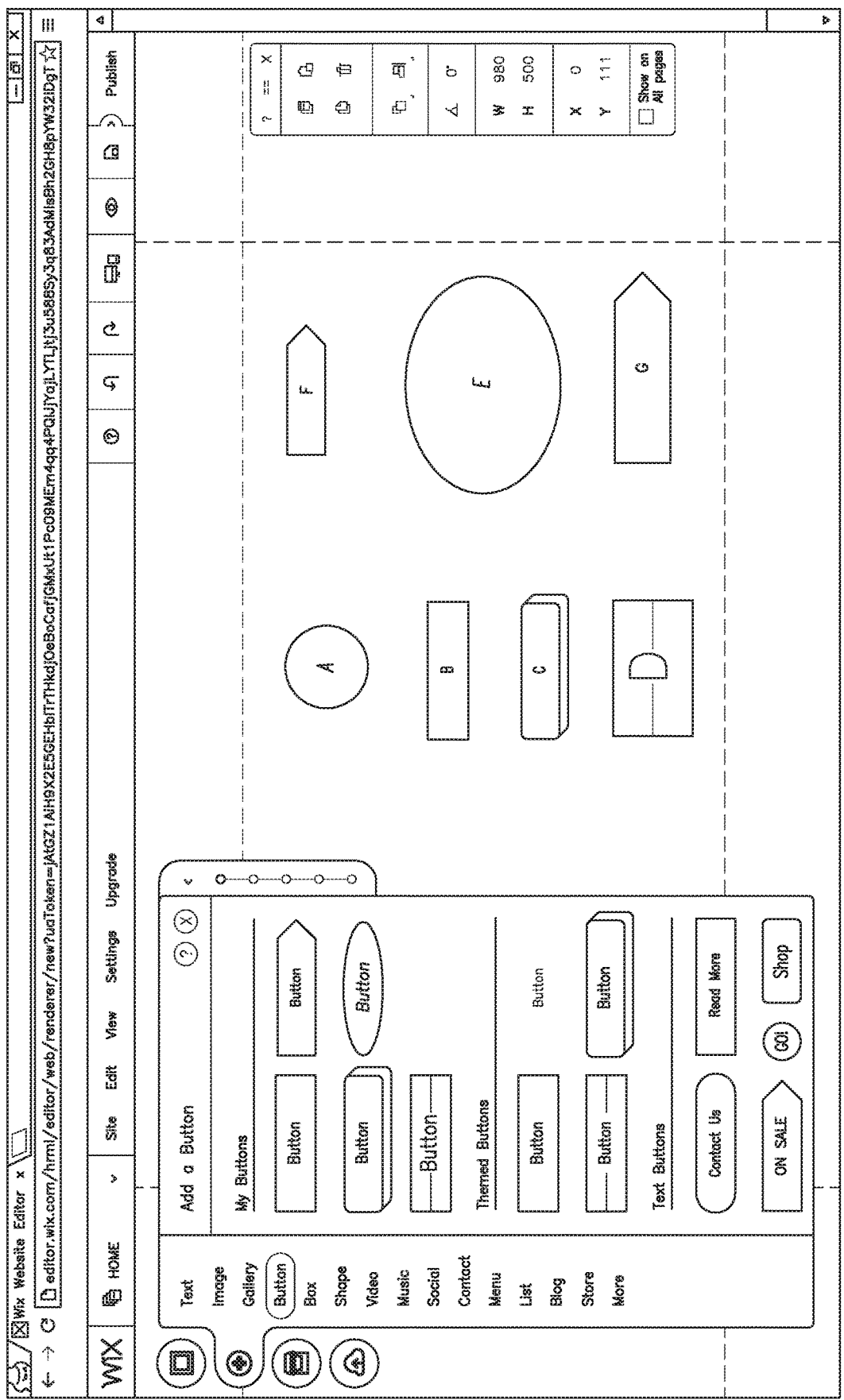
FIGS. 13A and 13B are screenshots of a "My Buttons" panel; in accordance with a preferred embodiment of the present invention.
Figure 13B:
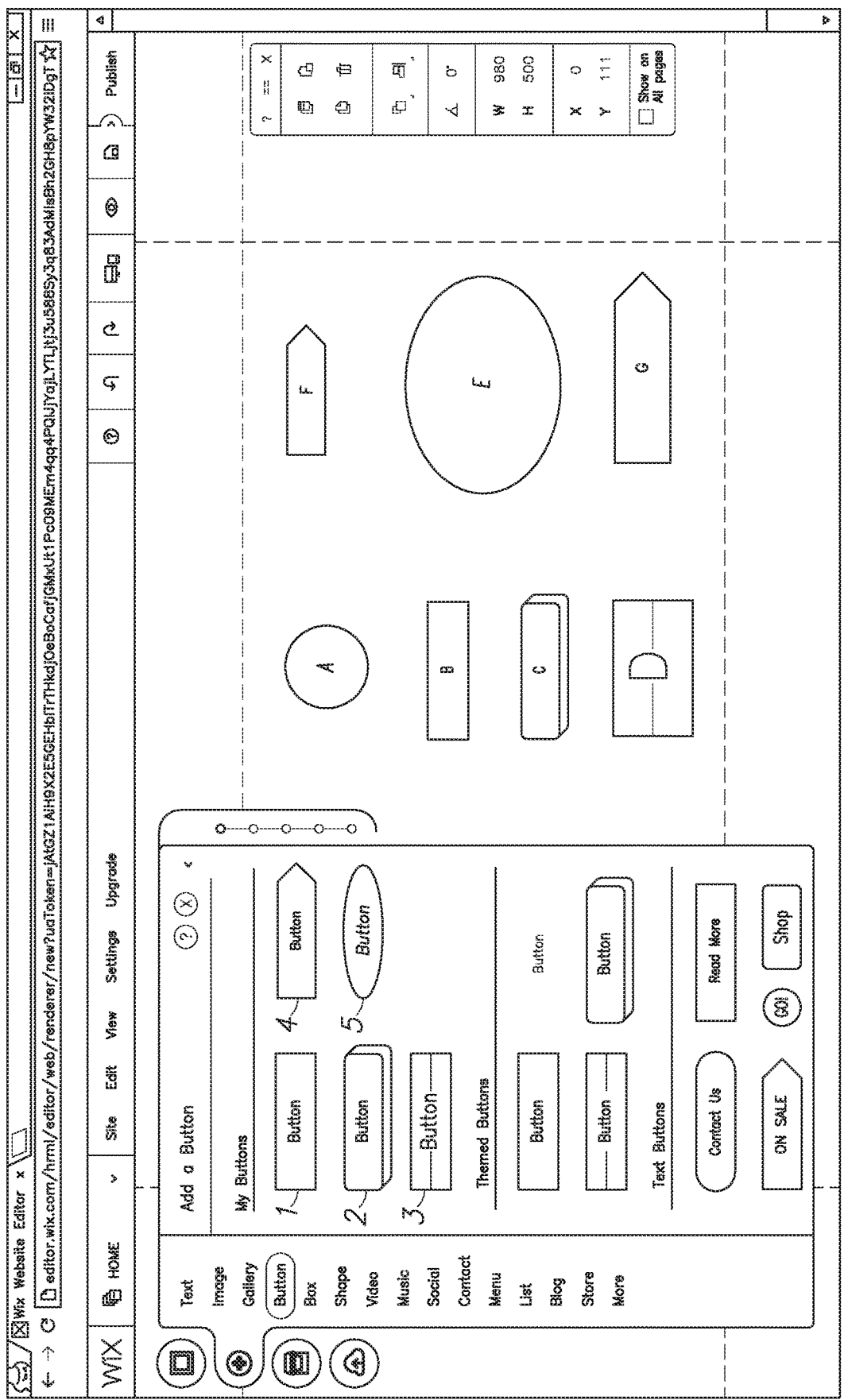

Reference is now made to FIGS. 13A and 13B, which represent 7 buttons (A-G) with various designs. The "My Buttons" section contains 5 representative buttons (1-5) which represent the various represented components (i.e. buttons):

| Representative Button | Represented Button | Cluster Size |
|---|---|---|
| 1 | B | 1 |
| 2 | C | 1 |
| 3 | D | 1 |
| 4 | F, G | 2 |
| 5 | A, E | 2 |

Component clusterer 122 may unite all buttons according to specific attributes, i.e. it may regard all buttons having specific attribute values in common as identical. For example, it may ignore non-design attributes (e.g. button size, position and label text) as well as text font size and text character attributes (e.g. italics, bold) but may consider other design attributes instead.

Alternatively, clusterer 122 may use any multi-dimensional clustering algorithm known in the art, mapping the various attributes into spatial dimensions. It will be appreciated that the distance function used by such algorithm may have to be adapted due to differences in various attribute dimensions which do not have an identical visual effect. For example, substantial differences in the corner radius of a buttons (i.e. sharp vs. rounded corners) may be far less visually noticeable than differences in the color of the button. Some design attributes (such as the font used) may be discrete rather than continuous, and require a special distance metric (a "font distance" function).

Component clusterer 122 may also use different cluster sizes in different situations. If, for example, user 5 uses numerous button designs, clusterer 122 may use "larger clusters" so to create a smaller number of clusters, with each cluster representing a larger variety of button designs.

As discussed herein above, representative component generator 123 may select representative components to be displayed. Reference is now made back to FIGS. 13A and 13B. It will be appreciated that in this example, finding a representative button for each cluster is easy, as the clusters are small (1-2 components each).

In a different scenario, the clusters may be substantially larger and may contain many different components. In such a case, representative component generator 123 may determine a "best representative component" selection subsystem.

For each cluster C, representative component generator 123 may find the cluster member X whose total distance D(X) from all other members of C is the smallest (using a "total distance" metric function D( )). If the total distance D(X) for the member is sufficiently small (using an absolute threshold, or comparing to the "size" of the cluster), it may then use X as a representative member.

Otherwise, representative component generator 123 may generate an "average" component Y based on averaging the various attribute dimensions also taking into account discrete attributes (such as fonts) which cannot be easily "averaged" (using a specific discrete attribute representative selection function). It will be appreciated that representative component generator 123 may also use other mathematical functions.

Alternatively, representative component generator 123 may use importance-based criteria to select the representative component (e.g. appears most often, edited most often, occupies largest total area, appears in most pages, appears in major page menus etc.).

Once representative component generator 123 has determined a set of representative components, editor UI builder 130 may create the appropriate user interface. As discussed herein above, editor UI builder 130 may comprise a searcher 131, a DVA section builder 132 and a menu generator 133.

Searcher 131 may find other relevant (non-representative) components for use in the dynamic variants area section which are not part of the representative components set generated by representative component generator 123, such as the query result components relevant to a search results section added as a result of user 5 using query features as described herein above.

DVA section builder 132 may receive the representative components from site analyzer 120 and (possibly) query result components from searcher 131. Menu generator 133 may then generate the final menu hierarchies to be presented to user 5.

As discussed herein above, the "Themed" section may contain component configurations associated with a template used by the site. The association is typically created by templates' designers, though the website building system may provide a tool to create or edit such associations which may be used by third parties which are not the template creators.

The association is typically made with a full site template used for the creation of the entire site. However, a site may include multiple templates (e.g. page template, page section templates etc.).

DVA section builder 132 may allow each such template to provide its own associated component configurations. In such a case, DVA section builder 132 may create the per-panel "Themed" section by merging the component configuration lists associated with each of the relevant templates (using all templates in the site, or possibly limiting to the templates relevant to the current context, e.g. the current page being edited).

DVA section builder 132 may also remove a given component configuration from the "Themed" section and move it to "My Site" section upon use or upon modification by user 5.

For a "Themed" section, DVA section builder 132 may extract the required component style information and possibly the pre-defined display (as described in more detail herein below in relation to component placer 330) as stored on pre-defined component attributes database 77 and may then use these to generate the section.

For a "Presets" section, DVA section builder 132 may take the pre-generated display for the section and the information of the presented components. It may then use the pre-generated display to generate the section.

For other section types, DVA section builder 132 may use the pre-generated display, collected components (arranged using a layout algorithm) or other section data source (e.g. a training video) to generate the section. This may include retrieval of data from external source of repository as described herein.

Menu generator 133 may then merge the different dynamic variants area sections to generate the complete dynamic variants area panel as well as generate the side navigation menus based on the sections. It will be appreciated that this merging may be performed in a number of ways as known in the art, such as the creation of concatenated vertical menus (as illustrated in FIGS. 4-11), the creation of hierarchical menus, creating a tabbed dialog or other methods. It will be appreciated that the implementation may depend on the specific (e.g. web-based or native application) technology used to implement the website building system's user interface.

It will be appreciated that dynamic UI generator 20 may perform the processing described above when user 5 opens an application for editing and creates the full UI definition. During the editing session, dynamic UI generator 20 may function incrementally, updating the constructed UI on-the-fly as changes are made to the application (instead of performing a full scan and construction from scratch). The incremental processing may also include removal of now-unused style configuration through a garbage collection process. Such a garbage collection process may scan the unused style configurations and remove some or all of them according to predefined criteria such as how much time (or activity) have passed since the last use, or how many similar styles have been used since the last use of the style last use etc. Such a process may rely on information found in the various databases 72-78 (including in particular, editing history/BI database 72).

It will also be appreciated that the end result produced by UI generator 20 may be a UI description. Dynamic UI runner 30 may then execute the created/maintained UI description structure as discussed in more detail herein below.

It will be appreciated that dynamic UI generator 20 may also support other operations including transforming components for display as miniaturized components, handling of changes in component attribute, creation of component instances based on components in the dynamic variants area panel and handling of component additions/deletions.

Dynamic UI generator 20 may also support handling the effects of other website editing operations (such as page addition/deletion) and the handling style copying between components on the stage as well as from the stage component to the miniaturized component in the dynamic variants area panel (possibly applying the style to the components represented by the miniaturized component). It may further support handling search results sections and handling component creation through DVA component definition tool 80 (as described in more detail herein below).

It will be appreciated that a dynamic variants area section may be divided into two major types: collected and pre-defined.

Collected sections may be truly dynamic, their content is determined and collected during the website building system editing session, and may change from invocation to invocation of the same dynamic variants areas panel. Examples include sections such as "My Site" and "Search results". The included components may be selected based on the processing of the document being edited (such as the clustering algorithm noted above), by querying a graphical content management system containing a repository of components as further described below (using meta-data associated with the components, by checking for similarity to existing components already include in the sections) or may be selected from an external source.

Predefined sections may be fixed at the beginning of the session (based on the user and site parameters) and may not change during the session. Examples include sections such as "Presets" and "Themed". In some cases the "Themed" section would have to be collected (and not predefined) section. Such cases may include if system 100 moves, rather than copies, components from "Themed" to "My Site" upon use (as noted above) or if system 100 provides a "Themed" section editing capability. The predefined sections may be stored in predefined component attributes database 77.

For collected sections, editor UI builder 130 may create the section's display area and may display a set of miniaturized versions of the relevant components. These could be the actual components displayed at a small size, or a specific miniaturized version of the components (possibly lacking some of the finer UI sub-elements). It will be appreciated that the miniaturized components may be in general live components and function as the full-size version would, with a number of differences. For example they may be a limited visual simulation of the full-size components or may be mere thumbnails representing the components.

Dynamic UI runner 30 may display the miniaturized components which represent a specific component in the editing stage (or component cluster as described herein above) with the style configuration of the represented component as discussed herein above.

Application market manager 140 may provide an interface to third party application purchasing and management. Thus, it may provide dynamic variants area sections which include an interface allowing the user to purchase relevant third party applications for use within the created site. It may further manage the list of which third party applications have been purchased already (including version/package information for third party applications which provides multiple versions and packages), providing the required information so editor UI builder 130 would be able include the right components in the relevant dynamic variants area sections.

It will be appreciated that discussion so far has been focused on UI generation (based on the website content and editing) inside the dynamic variants area panels. However, regular UI modifier 50 may generate or modify the UI in the regular menu hierarchies (i.e. outside of dynamic variants area panels) as well.

UI modifier 50 may evaluate the components (and third party applications in particular) installed in the current site being edited, and based on the use of these components add or modify UI elements (such as menu entries or buttons). The evaluation of component use may include checking for their mere inclusion, their configuration or their parameters. The added/modified buttons or UI elements (e.g. due to the installation of a given underlying third party application X) may be referred to as an added/modified element. Pressing or selecting such an added/modified element may cause a UI element to pop up which includes settings for the underlying third party application X. Each such underlying third party application may have its own added/modified element although multiple underlying third party applications may share a single added/modified element. UI modifier 50 may only add a single instance of the shared added/modified element even if multiple underlying third party applications using the shared added/modified element are installed.

A single underlying third party application may also require multiple added/modified elements added (for example) at different levels of the system menu hierarchy.

UI modifier 50 may limit the number of added/modified elements added (e.g. so to limit a top-level visual menu size). In such a case, UI modifier 50 may select the added/modified elements to be applied based on parameters related to the underlying third party application use or its history (such as number of instances, prominent position on the page, page real estate, amount of content, level of setup and actual use in editing).

UI modifier 50 may process underlying third party applications at the page rather than site level so the UI displayed when editing each page will depend on the third party applications installed in the edited page. In such a case the UI would change when editing different pages.

UI modifier 50 may also determine a specific order of the added/modified elements. In particular, the system may order the added/modified elements based on the order of underlying third party applications in the edited website (e.g. using page order, per-page topological/geometrical sorting or other component order derivation algorithm such as the ones described in the US Patent Publication 2015/0074516 entitled "SYSTEM AND METHOD FOR AUTOMATED CONVERSION OF INTERACTIVE SITES AND APPLICATIONS TO SUPPORT MOBILE AND OTHER DISPLAY ENVIRONMENTS" published 12 Mar. 2015 and assigned to the common assignee of the present invention).

It will be appreciated that users may fail to notice the added/modified elements (e.g. the added buttons or other UI elements), as predicted by the perceptual phenomena of change blindness. Thus, UI modifier 50 may be required to emphasize or highlight the added/modified element. In this scenario, UI modifier 50 may add a new modal dialog which points to the added/modified element and explains its function. User 5 would be required to review this dialog and confirm its review before he can continue working.

In an alternative embodiment, UI modifier 50 may highlight the added/modified element in some way (color, background, blinking, visual effects, etc.)

Marketer/offerer 40 may provide to dynamic UI generator 20 a tailor made promotional package or marketing campaign for user 5 as described in U.S. patent application Ser. No. 15/168,295 titled "SYSTEM AND METHOD FOR CAPABILITY PACKAGES OFFERING BASED ON ANALYSIS OF EDITED WEBSITES AND THEIR USE" filed 31 May 2016 and assigned to the common assignee of the present invention. It will be appreciated that these promotional packages or marketing campaigns may be stored on marketing database 78.

It will be appreciated that the website building system vendor may use DVA component definition tool 80 to create a single component and style definition. It will be further appreciated that most of the dynamic variants area panels require the website building system vendor to generate numerous combinations of components and attribute configurations. This task may be performed by designers (working for the website building system vendor or otherwise) using DVA component definition tool 80. DVA component definition tool 80 may be integrated into the standard web site building system editor and may be coupled with predefined component attributes database 77. The designer may create the component, customize the attributes, add specific metadata (which will affect the components' classification into dynamic variants area sections) and save it to predefined component attributes database 77.

Dynamic UI runner 30 may later pre-generate the predefined section display images or include the components in the collect sections saved predefined component attributes database 77 using the metadata selection criteria as discussed herein above.

Thus, it will be appreciated that dynamic UI generator 20 may combine the results from marketer/offerer 40, regular UI modifier 50 and DVA component definition tool 80 into generated menu definitions to be used by dynamic UI runner 30 to create the final user interface.

Figure 14:
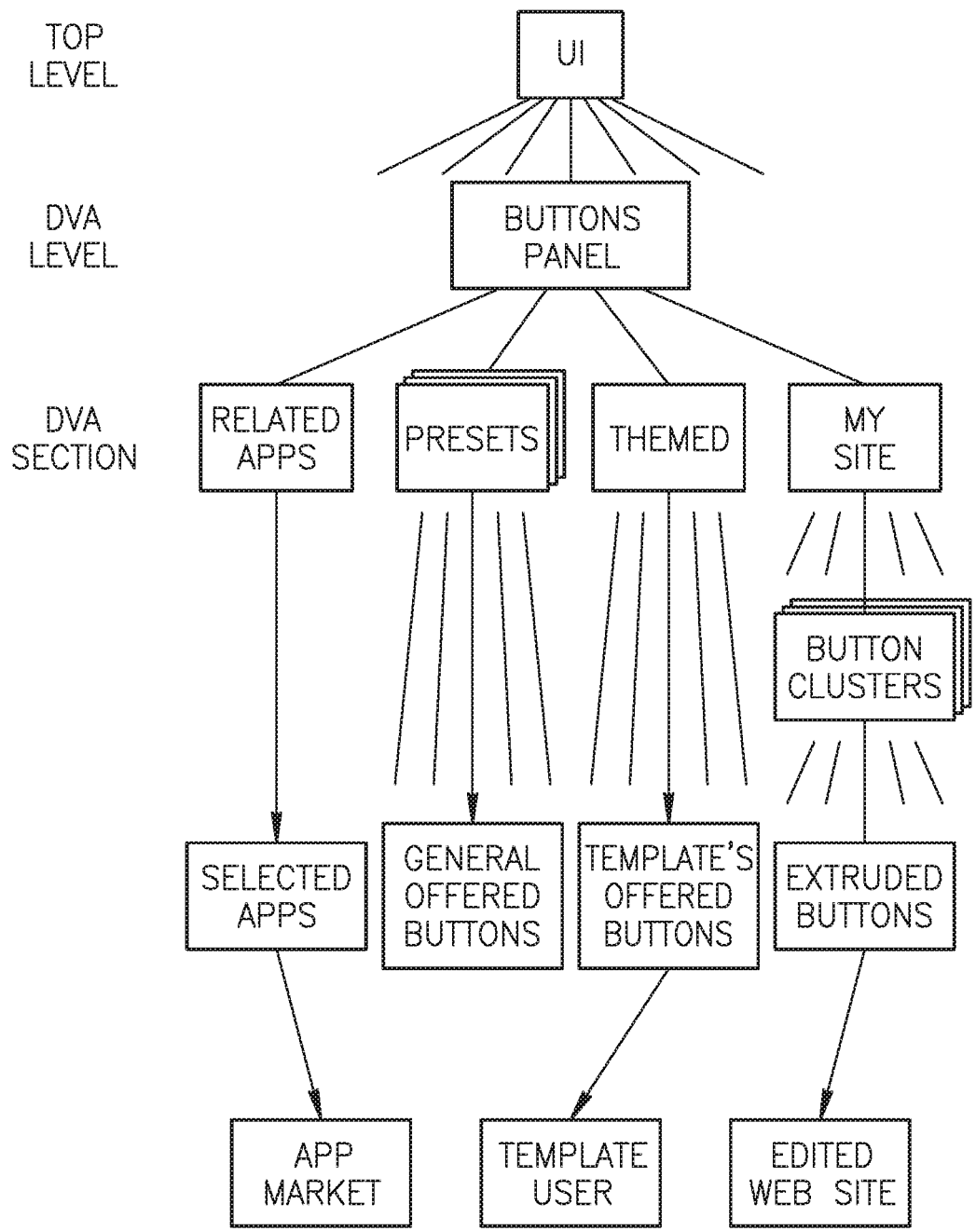
FIG. 14 is a schematic illustration of a segment of the data hierarchy created by the dynamic UI generator of FIG. 1, in accordance with a preferred embodiment of the present invention.

Reference is now made to FIG. 14 which illustrates a segment of the data hierarchy created by dynamic UI generator 20 and executed by dynamic UI runner 30. As is illustrated, each created UI (top level) may include a dynamic variants area panels and each panel may be made up of dynamic variants area sections. A section may be made up of related applications together with the different types as described herein above-presets, themed and my site, which may all in turn include their own buttons etc.

Figure 15:
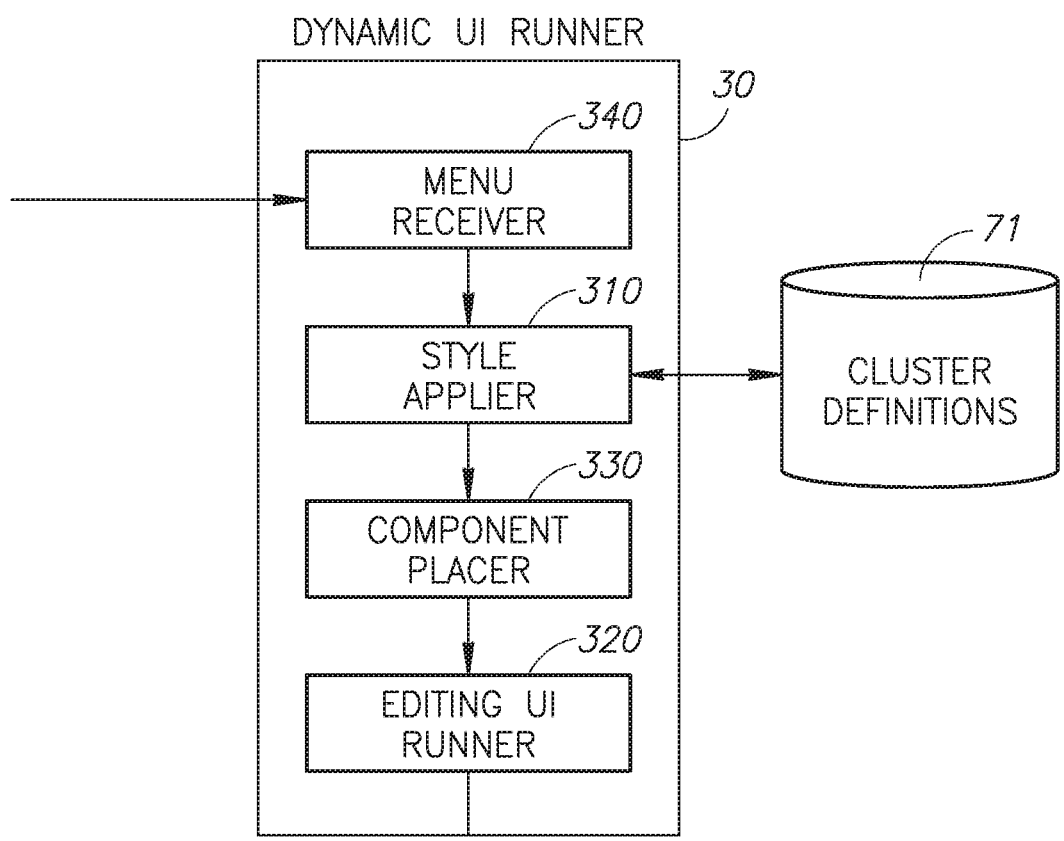
FIG. 15 is a schematic illustration of the dynamic UI runner of FIG. 2; in accordance with a preferred embodiment of the present invention.

Reference is now made to FIG. 15 which illustrates the elements of dynamic UI runner 30. Dynamic UI runner 30 comprises a menu receiver 340, a style applier 310, an editing UI runner 320 and a component placer 330.

Menu receiver 340 may receive the menu definitions from dynamic UI runner 20 and may forward then to style applier 310. Style applier 310 may apply requested style changes by users to the components in the menu definitions and may also apply these changes to other multiple components in the same cluster, based on definitions stored on cluster definitions database 71. It will be appreciated that the applied style changes may be applied to the presentation of the component in the dynamically generated menus, and may also be applied to the instances in which the modified components have been used in the website or parts thereof. Component placer 330 may place the pertinent components into the dynamic variants area and editing UI runner 320 may create the final UI presenting a visual layout for menu selection.

It will be appreciated that editing UI runner 320 may also edit and modify attributes where necessary in order to run the menu definitions accordingly (e.g. replacing components with a miniaturized version of the components for their in-menu display). Editing UI runner 320 may modify some attributes of the miniaturized components (as compared to the full-size versions of these components), so to make these attributes more visible in the miniaturized component. For example, editing UI runner 320 may change a corner radius or border width so they will be more noticeable in the miniaturized component.

Some miniaturized components are displayed with specific settings. For example, galleries may be displayed with an option causing them to scroll when the mouse hovers over them.

It will be appreciated that some interactions with the miniaturized components may be modified or disabled. In particular, some mouse operations on the miniaturized components should be disabled, so that the mouse may be used to drag and drop the component into its desired place on the stage.

Style applier 310 may allow the user to apply style configurations to components. These methods may include via a style setting UI and direct style copying. The copying option includes direct copying of style from one component to another and can be done through a 2-component UI operation (e.g. "copy style from component X to component Y") or through a "copy/apply style" set of operations performed by the user. It will be appreciated that this option may require using style translation if applying a style from a component to another component of different type, translating attributes between the two component types whenever possible.

Style applier 310 may also apply a style to multiple represented components. System 100 may allow a single style to be applied to multiple components included in one component cluster (as described above) and represented by a single representing component A (in the "My Site" dynamic variants area section). It will be appreciated that in this scenario, it may apply based on definitions stored on cluster definitions database 71. It will also be appreciated that cluster definitions database 71 is just a temporary storage of the cluster and representative component definitions created by analyzer 120 so that the style applier 310 may function as required. It will be further appreciated that cluster definitions may change after each modification to a particular page.

It will also be appreciated that user 5 may manually modify the style of the representing component A (e.g. by copying a style from a component in the stage to A in the "My Site" area, or by editing A's style setting directly).

Style applier 310 may apply the style just to the displayed representative (clustered) object, to be used when creating new instances from it, apply the style to all objects represented by the representing component A automatically, apply the style to all objects represented by the representing component A interactively (e.g. by showing a preview of the represented objects) or apply the style to all objects represented by the representing component A, while compensating for changes due to the clustering, i.e. combine the new layout parameters P (applied to A) with the differences between the represented component B and the representing component A.

It will also be appreciated that style applier 310 may allow user 5 to make changes to components in the "Themed" section and thereby affect the entire site, e.g. change all buttons which currently use design P to design Q.

Component placer 330 may place the miniaturized components in the section using one of the layout algorithms known in the art (e.g. placing along lines or placing on a fixed grid, allocating cells according to the components' size). The order of the components may be pre-defined (i.e. there may exist a pre-defined layout) based on (for example) aesthetic grouping (group similar components together), attribute clustering (similar to the clustering algorithm above), according to the order of the represented components in the underlying application or according to editing history (e.g. frequency of use).

The miniaturized component size determination and layout algorithm may also be based on global aesthetic rules. For example, components which occupy the entire screen width (horizontal strips) may be represented by a miniaturized component which occupies the entire dynamic variants area section width. As discussed herein above, such a layout may be recalculated by component placer 330 when the underlying list of components changes during editing.

It will be appreciated that predefined sections typically contain the bulk of the displayed components since the majority of the sections are predefined "Presets" sections containing numerous components as is represented in FIGS. 4B and 6B back to which reference is now made.

Thus, editing UI runner 320 may use a different strategy for these sections. Instead of using live miniaturized components, editing UI runner 320 may use sets of per-component thumbnails using "screen shots" of the components. It will be appreciated that editing UI runner 320 may be required to use multiple thumbnails per component due to the fact that components may have multiple states (e.g. pressed vs. un-pressed buttons, or galleries which rotate between multiple displayed versions) and due to the fact that components may include text which has to be displayed in multiple languages.

Editing UI runner 320 may also be required to simulate some basic component actions, such as button pressing and un-pressing (which would toggle between the multiple thumbnails), gallery animation etc. Editing UI runner 320 may also display a video overlay for given component so to display its functionality (e.g. complex gallery animations which cannot be easily displayed using a few thumbnails).

In this scenario, component placer 330 may place the components in a predefined section in a number of ways including: using the layout algorithms defined above, although they would be used off-line—outside of the session (i.e. following a component repository change), using manual layout by designers optimized for the specific components and configurations included in the section or by using each of the methods above since the screen image of the section can be pre-generated and stored, so to be quickly displayed during website building system use.

Editor UI builder 130 may also support a hybrid section creation methodology, in which the section is predefined, but components may be added to it during run-time. In such a case, editor UI builder 130 may modify the pre-generated section's screen image (as discussed herein above) by appending the additional components at its bottom during run-time (and after arranging the additional components as noted for collected sections above).

It will be appreciated that the discussion herein above has been focused on dynamic variants area panels which display components with variations in their style configurations. However, Style applier 310 may also apply non-style attribute changes.

For example, the website building system may offer multiple (visually identical) search buttons all labeled "search" which provide links to popular search engines (such as Google, Bing, Yahoo etc.). In this scenario, style applier 310 may allow user 5 to differentiate between these visually identical buttons. This can be done using (for example): information supplied by user 5 (such as tooltip label or alternative icon), automatically assigned separate colors/markers/labels and automatic analysis of multiple visually-identical buttons, and with the different information between them displayed when needed (e.g. using a tooltip).

It will be appreciated that the above discussion has focused on the creation of dynamics variants area panels using single components and their variations.

However, system 100 may also be implemented to support composite objects which are not just components, but rather component sets (and possibly including additional system elements such as anchors, associated logic, ribbons etc.).

In such a case, the website building system vendor personnel may use DVA component definition tool 80 as discussed herein above, but may apply it to multiple components instead. In this scenario, the vendor may apply DVA component definition tool 80 to a set of multiple components or may select a container together with its contained components (regular dynamic variants area supplied containers are typically empty). It will be appreciated that the website building system vendor would have to specify metadata to the selected component set which would allow dynamic UI generator 20 to classify it into the right dynamic variants area section. The website building system vendor may also specify that the component set is placed into a user-defined section discussed herein above. As discussed herein above, the function performed by the website building system vendor described above may also be carried out by users of the system through a version of DVA component definition tool 80 which is open to users.

It will also be appreciated that the discussion herein above has been focused on UI generation (based on the website content and editing) inside the dynamic variants area panels. However, system 100 may also generate or modify the UI in the regular menu hierarchies (i.e. outside of dynamic variation area panels) as discussed herein above in relation to added/modified elements.

Thus system 100 may allow a user 5 to produce a consistently themed website with conforming attribute settings through an analysis of the components including their editing history and business intelligence for an individualized website building experience for a large amount of users.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for a website building system (WBS), the system comprising:
    at least one hardware processor; and
    a unit running on said at least one hardware processor for creating a dynamically modified designer user interface for a designer using said WBS to design a website to be accessed by multiple end-users, said unit comprising:
    multiple databases storing information about said designer and information about websites built by said designer;
    a marketer to provide a WBS promotional package or a WBS marketing campaign tailor made for said designer according to said designer information and said information about websites built by said designer;
    a user interface (UI) modifier to evaluate component use and associated third party application use of said website, and to modify, remove or add UI elements for at least one menu of the regular WBS user interface accordingly;
    a dynamic UI generator to receive said WBS promotional package or said WBS marketing campaign from said marketer and a modified, a removed or an added UI element from said UI modifier and to create at least one updated menu as a dynamically modified designer user interface accordingly;
    a dynamic UI runner to generate said dynamically modified designer user interface; and
    a visual editor to present said regular WBS user interface together with said dynamically modified designer user interface to said designer.

2. The system according to claim 1 and also comprising:
    a component definition tool to receive edits and external component definitions to said website components from at least one of: a vendor of said WBS and said designer.

3. The system according to claim 1 wherein said use of said website components is evaluated according to at least one of: their inclusion, their configuration and their parameters.

4. The system according to claim 1 wherein said use of said associated third-party application is evaluated according to at least one of: number of instances within said website, position on a page of said website, amount of containing content and level of setup.

5. The system according to claim 1 wherein said UI modifier adds a dialog to said designer to point to said modified or added UI element and explains their function.

6. The system according to claim 1 wherein highlights said a modified or added UI element using at least one of: color change, background change, blinking and a visual effect.

7. The system according to claim 1 wherein said dynamically modified designer user interface comprises at least one dynamic variants area panel and wherein each said at least one dynamic variants area panel comprises at least one dynamic variants area section.

8. The system according to claim 7 and wherein said dynamic UI runner comprises at least one of:
- a receiver to receive said at least one updated menu from said dynamic UI generator;
- a style applier to receive and to apply styles from said designer to components of said at least one updated menu;
- a component placer to place said components of said at least one updated menu into said at least one dynamic area variants area section in a visual layout for menu selection; and
- an editing UI runner to run said at least one updated menu and create a display for said dynamically modified designer user interface based on said style applier and said component placer.

9. The system according to claim 7 and wherein said at least one dynamic variants area section comprises an interface to at least one third party application.

10. The system according to claim 1 and wherein a modified or an added UI element is at least one of: a component thumbnail creation, a component miniaturization, a component size reduction and a component attribute modification.

11. The system according to claim 1 wherein modified, removed or added UI element is at least one of: a menu entry and a button.

12. The system according to claim 1 wherein said dynamic UI generator comprises:
- a page analyzer to classify and cluster said website components according to their type or class and to determine a single representative component for a cluster, said representative component to represent each said cluster using at least one of: geometric attribute parameters, average attribute dimensions and importance-based criteria; and
- an editor UI builder to display said representative component of clusters of components as part of said dynamically modified designer user interface as said designer edits said website.

13. A method for creating a dynamically modified designer user interface for a website building system (WBS), the method comprising:
- storing in multiple databases designer information and information about websites built by a designer using said WBS to design a website to be accessed by multiple end users;
- providing a WBS promotional package or a WBS marketing campaign tailor made for said designer according to said designer information and information about websites built by said designer;
- evaluating component use and associated third party application use of said website;
- modifying, removing or adding user interface (UI) elements for at least one menu of the regular WBS user interface according to said evaluating;
- receiving said WBS promotional package or WBS marketing campaign from said providing and a modified, a removed or an added UI element from said modifying, removing or adding UI elements and creating at least one updated menu for a dynamically modified designer user interface accordingly;
- generating said dynamically modified designer user interface; and
- presenting said regular WBS user interface together with said dynamically modified designer user interface to said designer.

14. The method according to claim 13 and also comprising receiving edits to said website components and external component definitions from at least one of: a vendor of said WBS and said designer.

15. The method according to claim 13 wherein said evaluating component use is according to at least one of: their inclusion, their configuration and their parameters.

16. The method according to claim 13 wherein evaluating associated third party application use is according to at least one of: number of instances within said website, position on a page of said website, amount of containing content and level of setup.

17. The method according to claim 13 wherein said modifying, removing or adding user interface (UI) elements also adds a dialog to said designer to point to said a modified or added UI element and explains their function.

18. The method according to claim 13 wherein said modifying, removing or adding user interface (UI) elements also highlights said modified or added UI element using at least one of: color change, background change, blinking and a visual effect.

19. The method according to claim 13 wherein said dynamically modified designer user interface comprises at least one dynamic variants area panel and wherein each said at least one dynamic variants area panel comprises at least one dynamic variants area section.

20. The method according to claim 19 and wherein said generating said dynamically modified designer user interface comprises at least one of:
- receiving said at least one updated menu from said receiving a WBS promotional package or a WBS marketing campaign from said providing and a modified, a removed or an added UI element from said modifying, removing or adding UI elements;
- receiving and applying styles from said designer to components of said at least one updated menu;
- placing said components of said at least one updated menu into said at least one dynamic area variants area section in a visual layout for menu selection; and
- running said at least one updated menu and creating a display for said dynamically modified designer user interface based on said receiving and applying styles and said placing said components.

21. The method according to claim 19 and wherein said at least one dynamic variants area section comprises an interface to at least one third party application.

22. The method according to claim 13 and wherein said a modified or added UI element is at least one of: a component thumbnail creation, a component miniaturization, a component size reduction and a component attribute modification.

23. The method according to claim 13 wherein said a modified, a removed or an added UI element is at least one of: a menu entry and a button.

24. The method according to claim 13 wherein said creating at least one updated menu comprises:

classifying and clustering into a cluster said website components according to their type or class and determining a single representative component for each said cluster, said representative component to represent each said cluster using at least one of: geometric attribute parameters, average attribute dimensions and importance-based criteria; and displaying said representative component of clusters of components as part of said dynamically modified designer user interface as said designer edits said website.

* * * * *